Feb. 12, 1924.
A. T. MOORE
1,483,829
BOX MAKING MACHINE
Filed Oct. 26, 1922 17 Sheets-Sheet 1
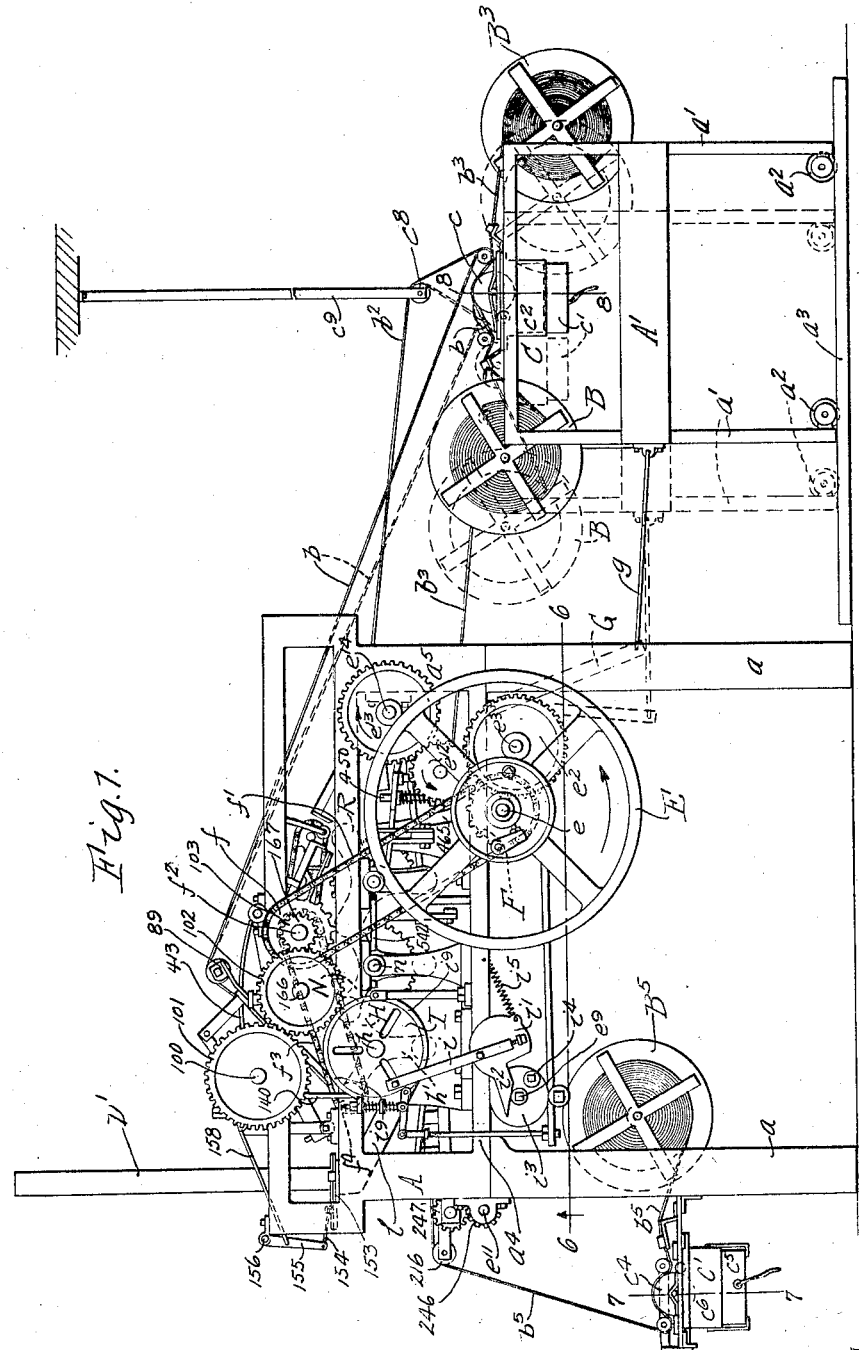

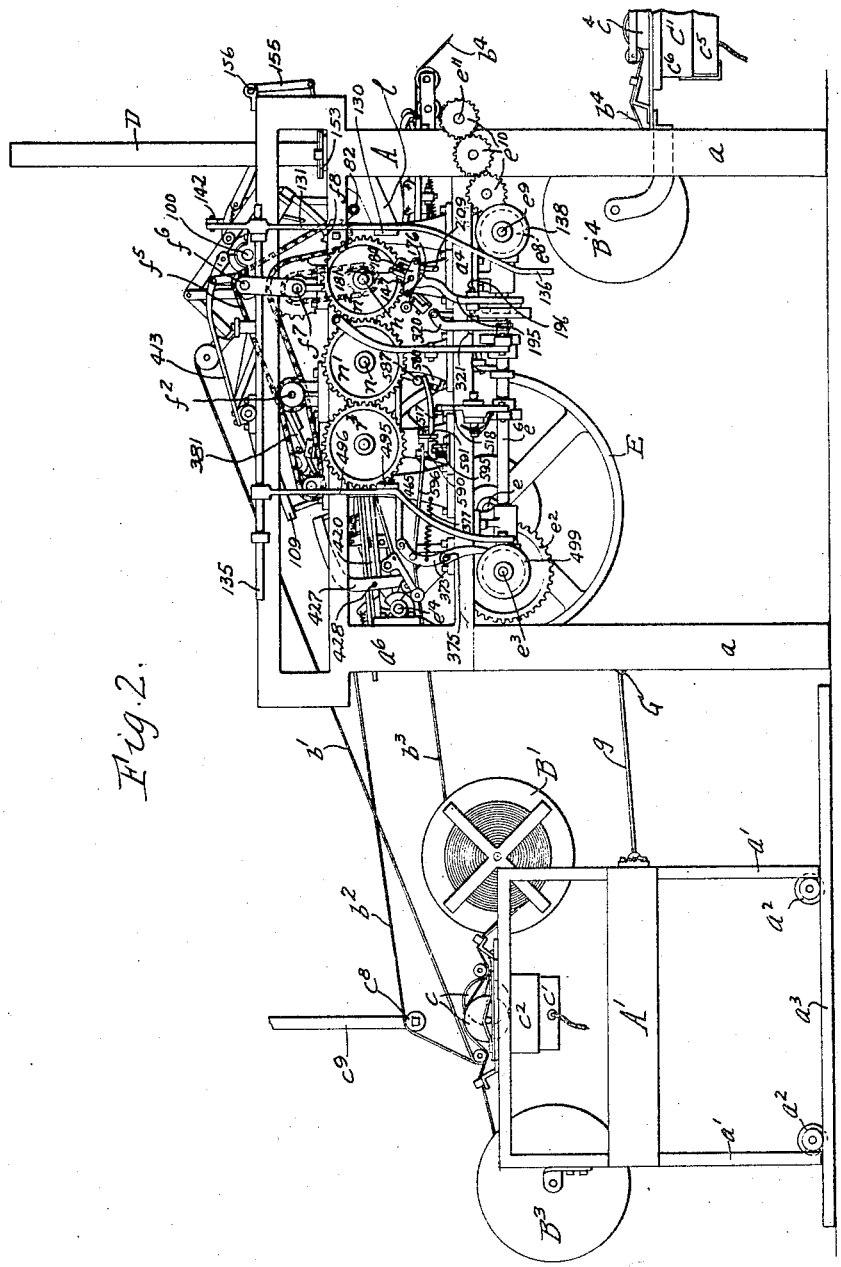

Feb. 12, 1924.
A. T. MOORE
1,483,829
BOX MAKING MACHINE
Filed Oct. 26, 1922      17 Sheets-Sheet 3
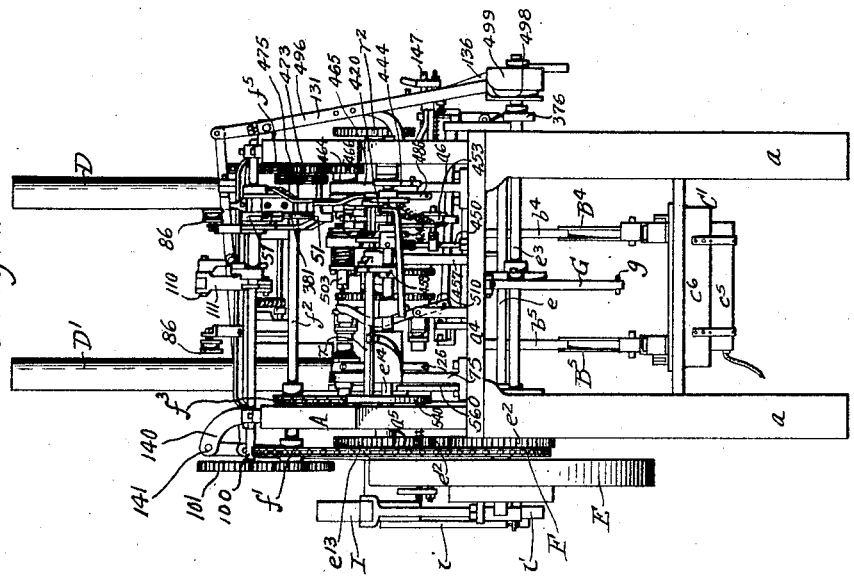
Inventor
Arthur T. Moore
by Parker & Brockman
Attorneys Feb. 12, 1924. 1,483,829
A. T. MOORE
BOX MAKING MACHINE
Filed Oct. 26, 1922 17 Sheets-Sheet 4
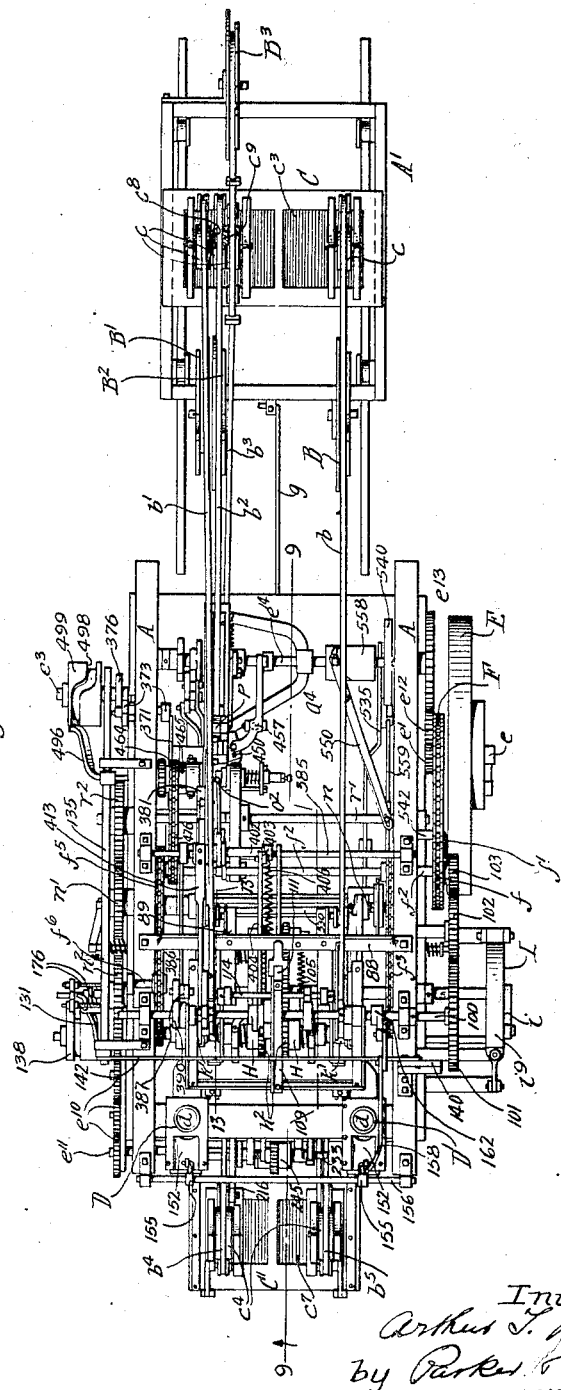

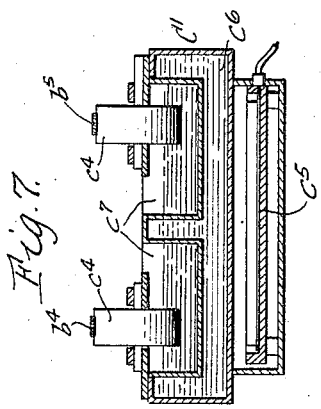
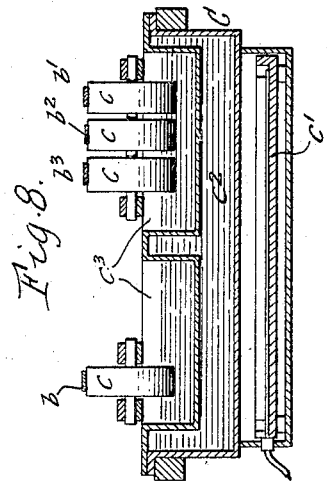
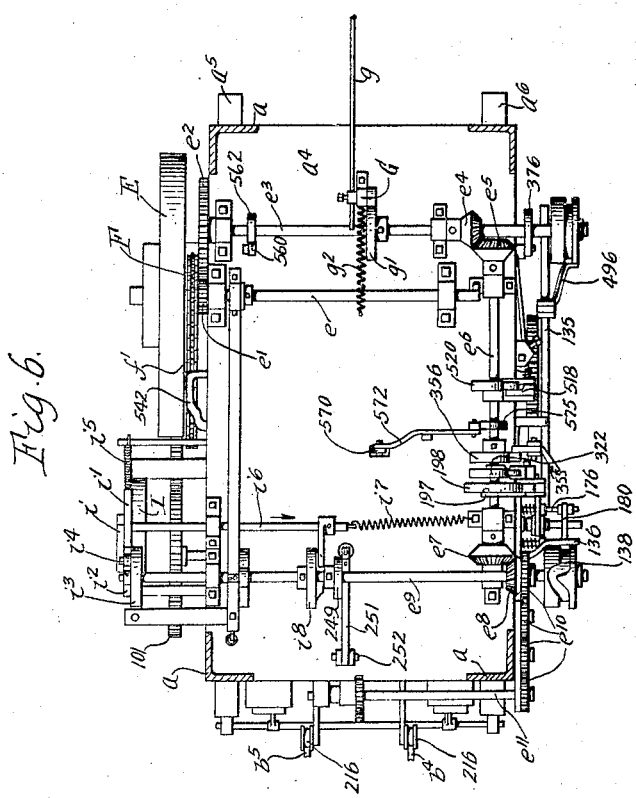

Feb. 12, 1924.

A. T. MOORE 1,483,829

BOX MAKING MACHINE

Filed Oct. 26, 1922

Inventor
Arthur T. Moore,
by Parker Prochnow
Attorneys

Feb. 12, 1924.

A. T. MOORE 1,483,829

BOX MAKING MACHINE

Filed Oct. 26, 1922    17 Sheets-Sheet 8

Inventor
Arthur T. Moore
by Parker & Brockman
Attorneys

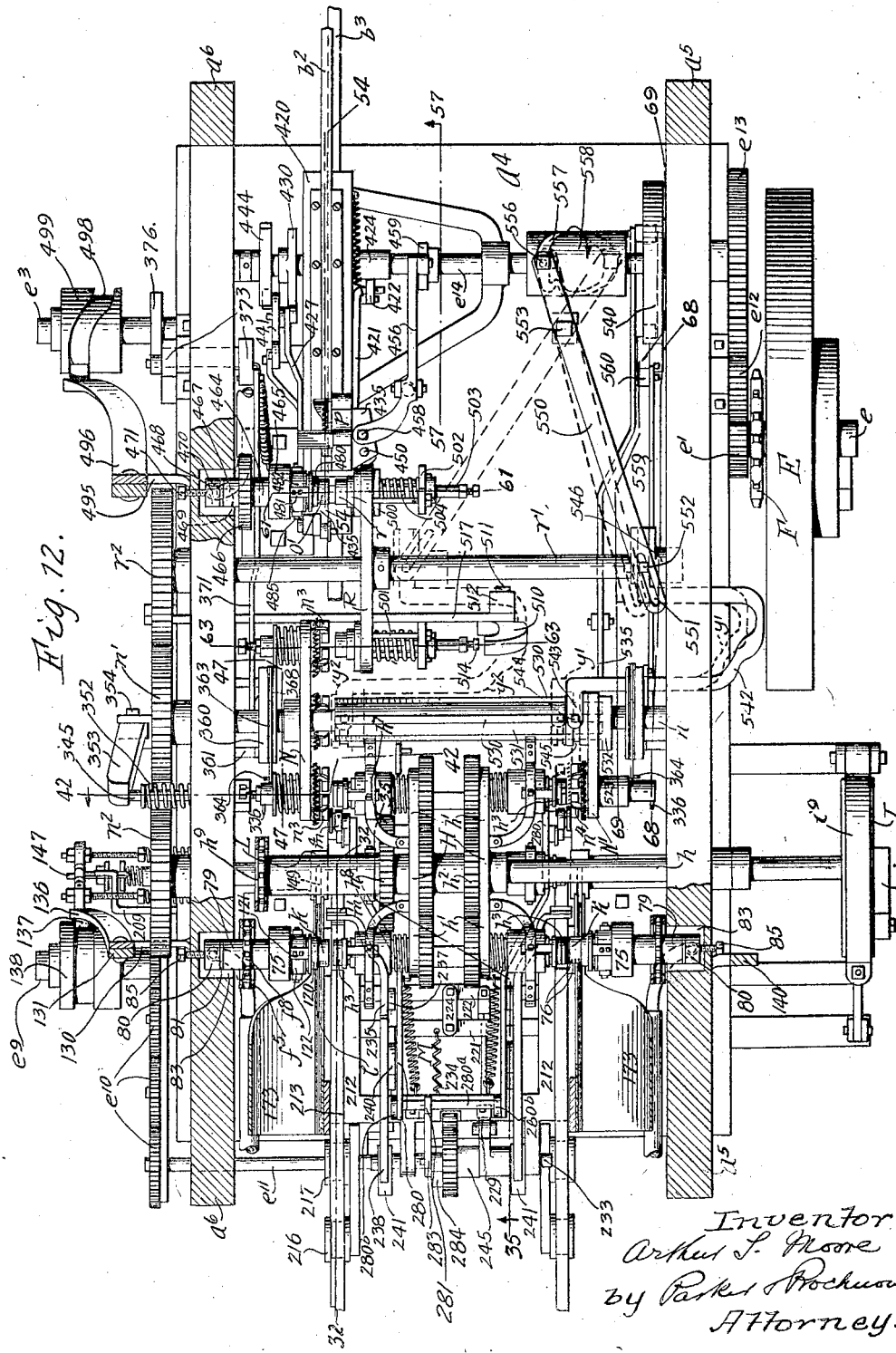

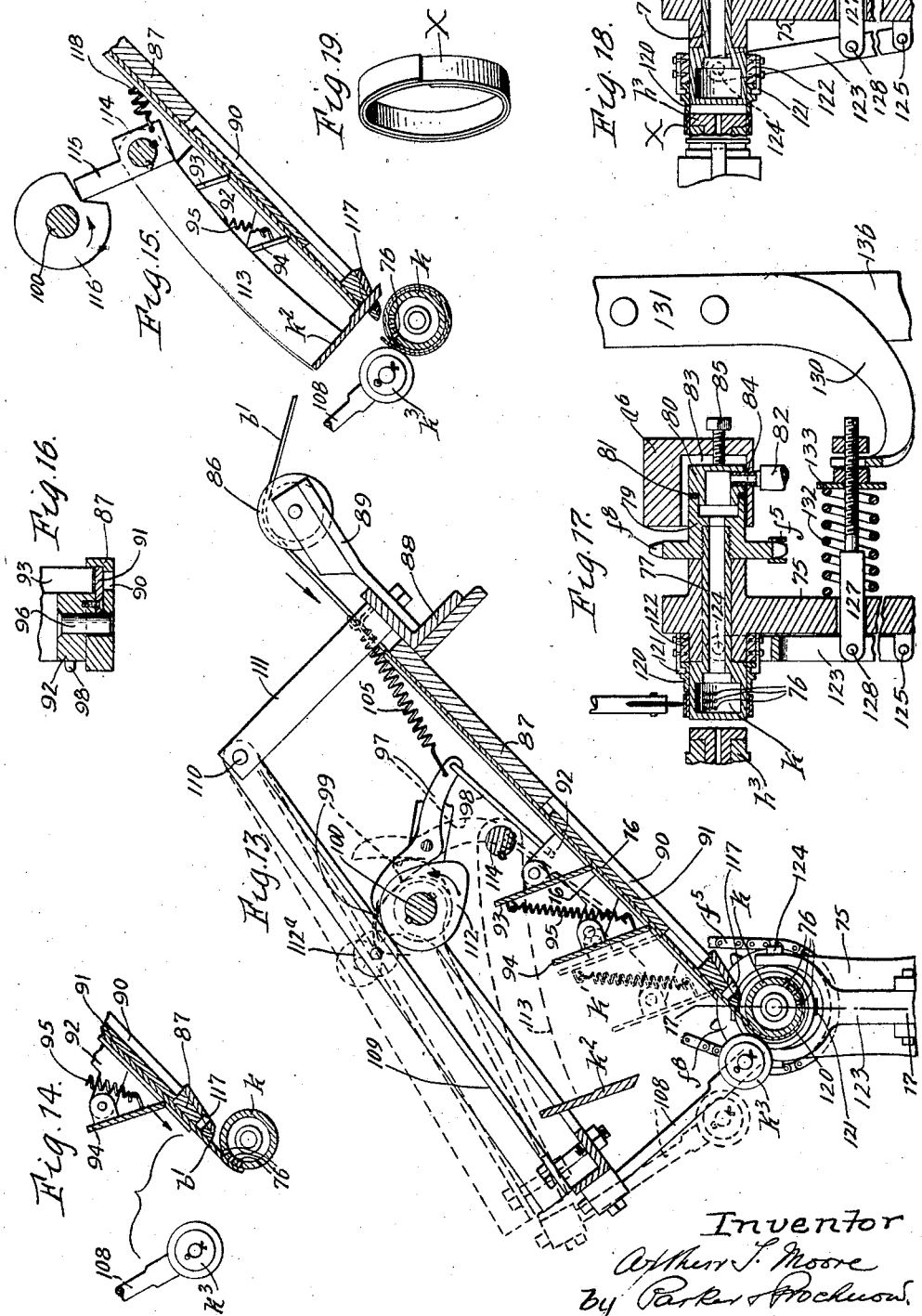

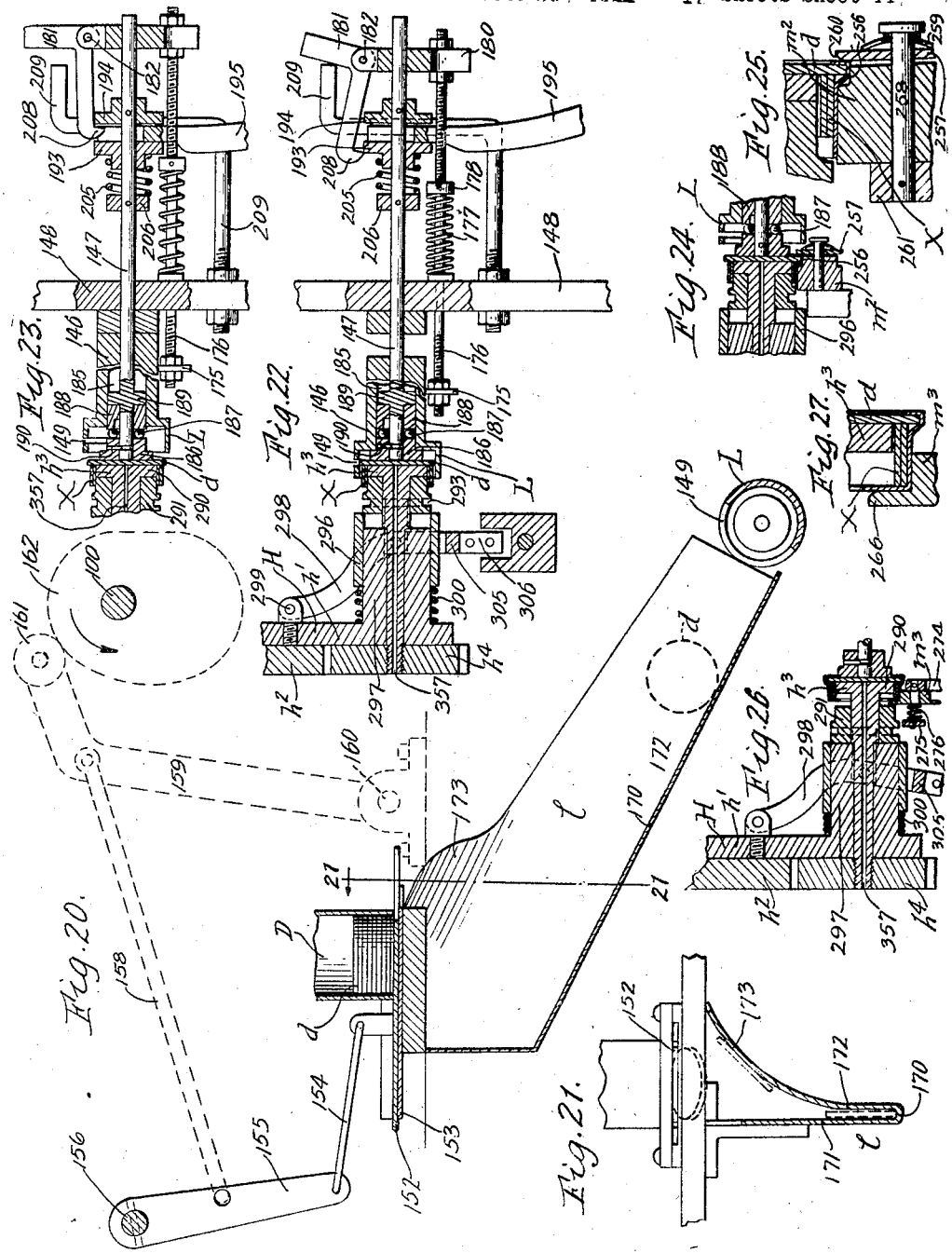

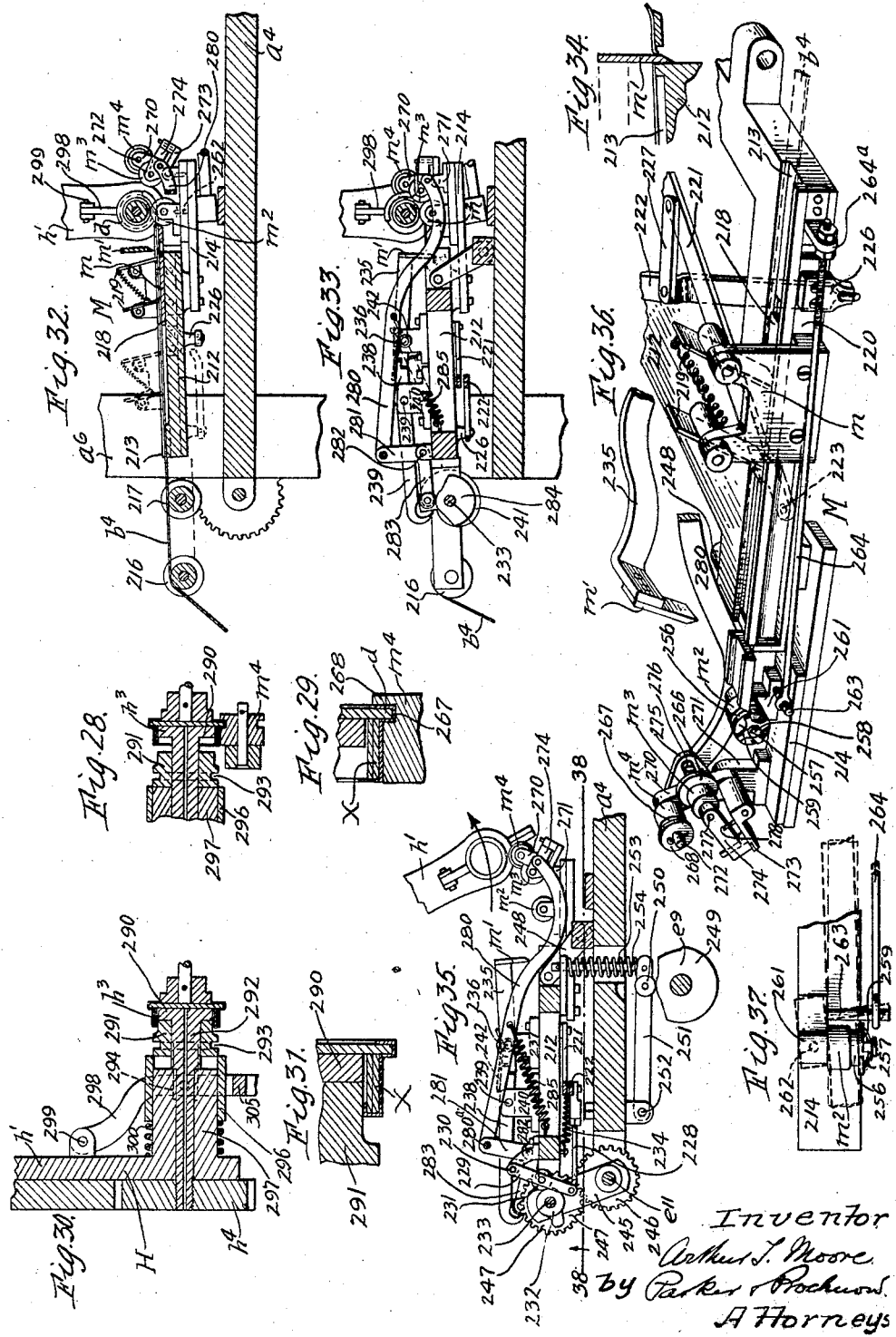

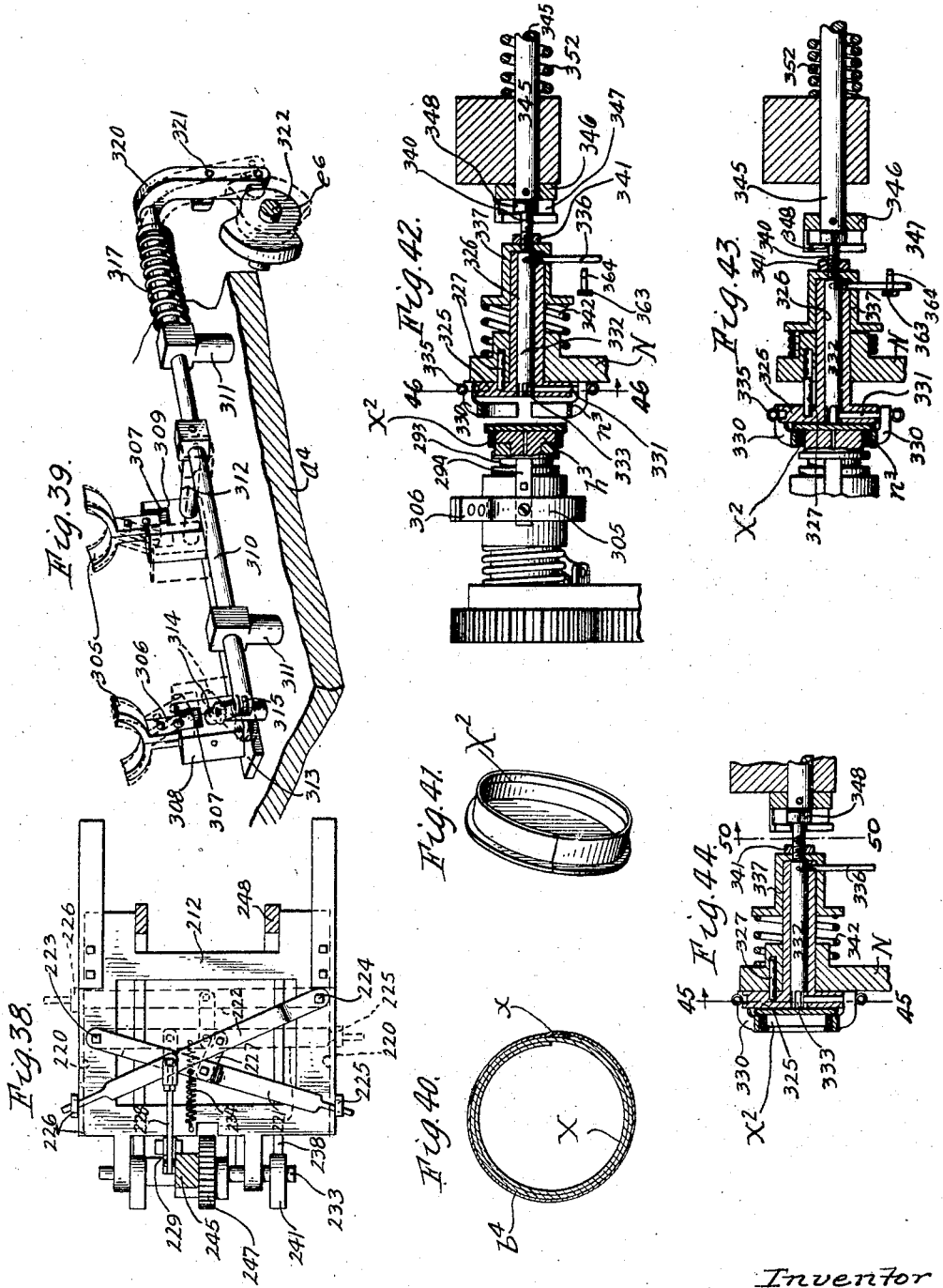

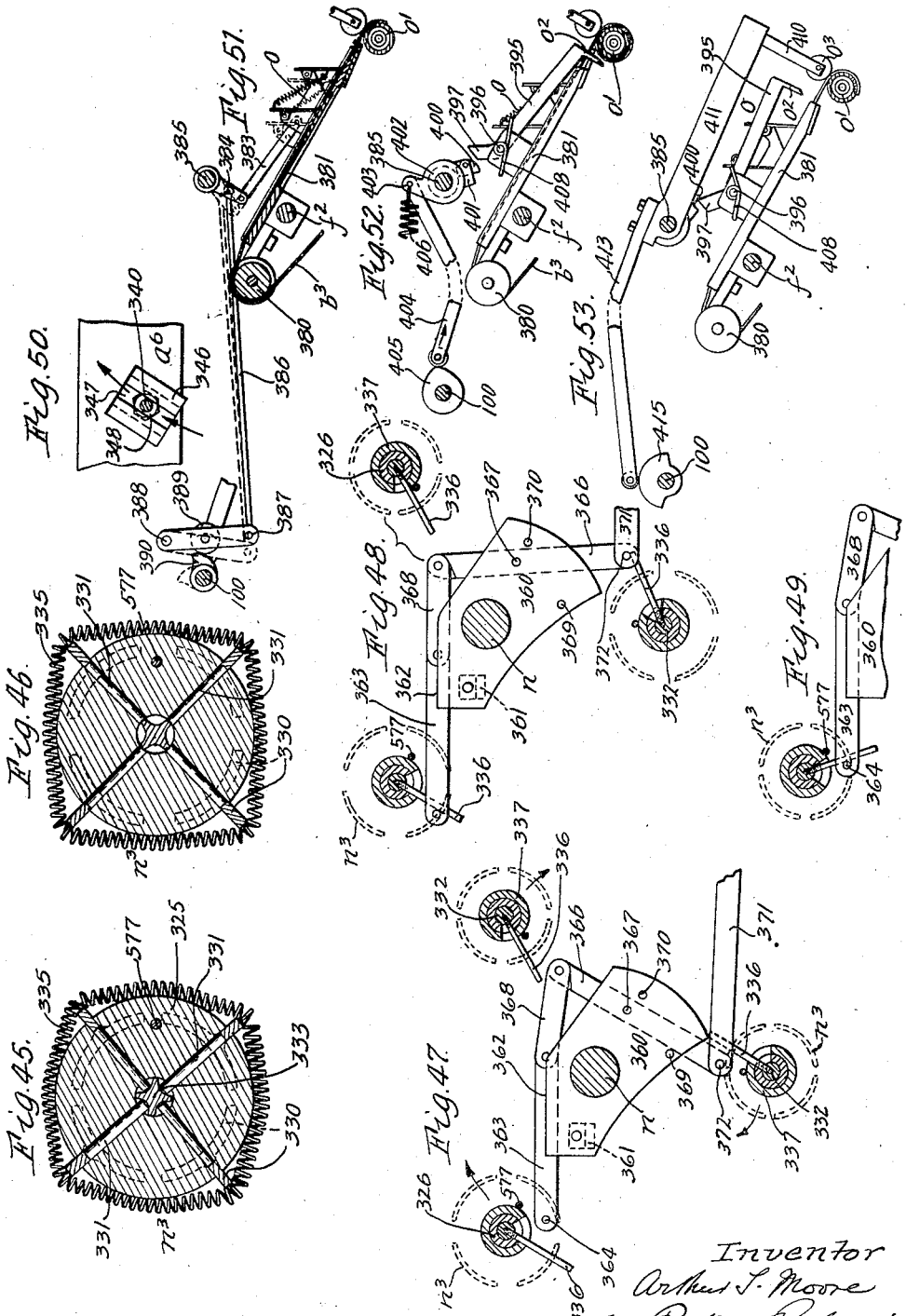

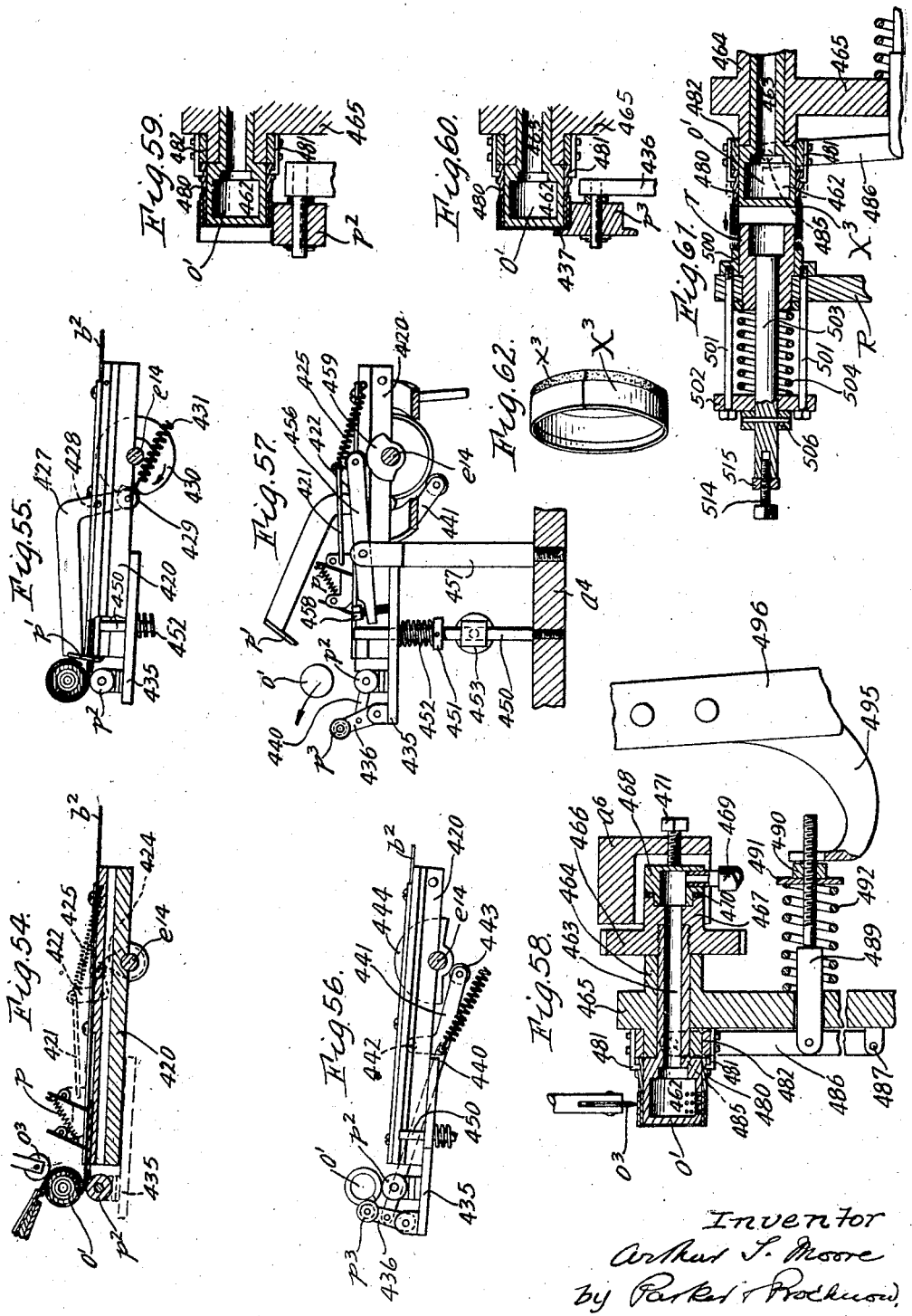

Feb. 12, 1924.
A. T. MOORE
1,483,829
BOX MAKING MACHINE
Filed Oct. 26, 1922    17 Sheets-Sheet 16
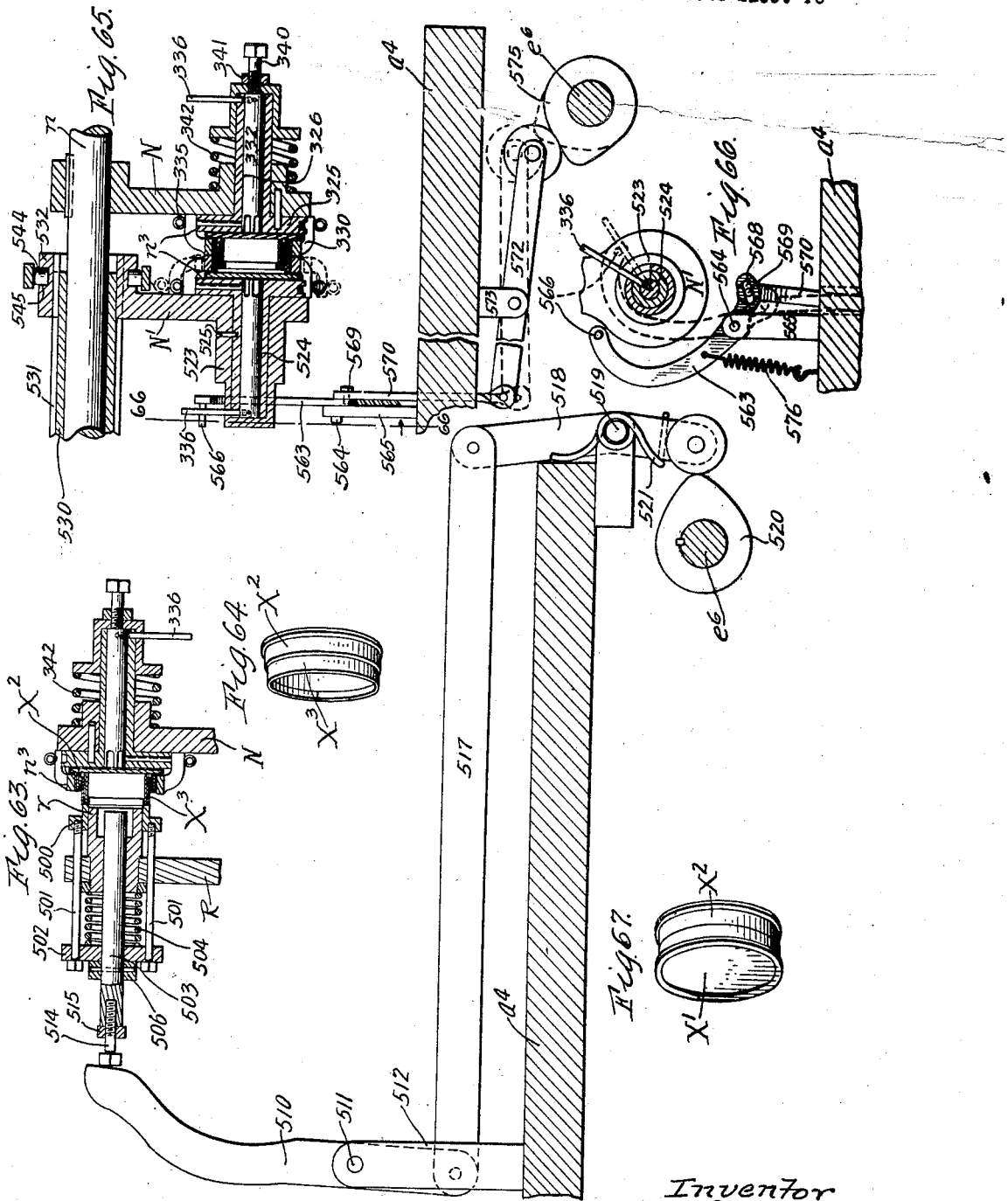

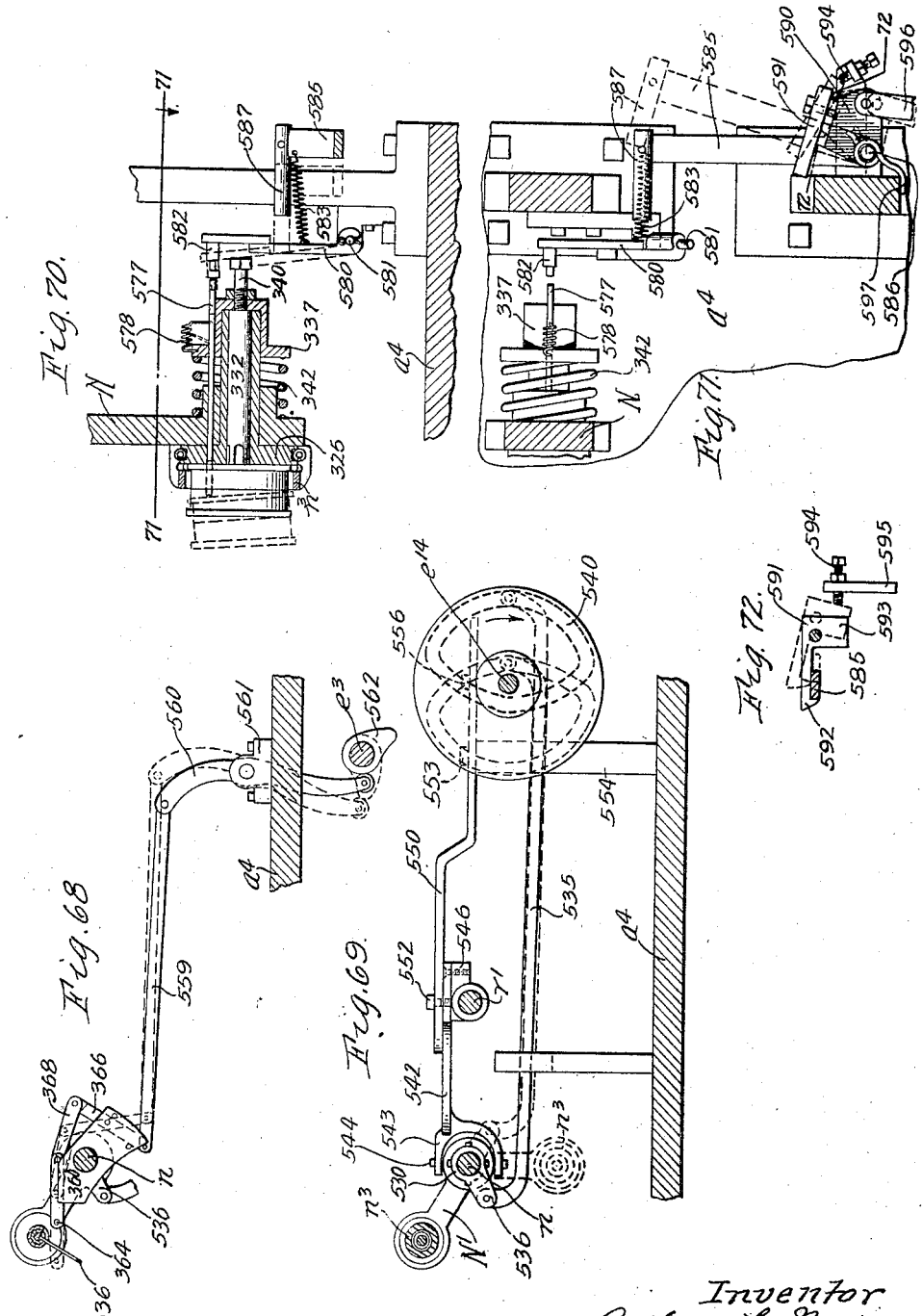

Patented Feb. 12, 1924.

1,483,829

UNITED STATES PATENT OFFICE.

ARTHUR T. MOORE, OF BATAVIA, NEW YORK.

BOX-MAKING MACHINE.

Application filed October 26, 1922. Serial No. 597,134.

*To all whom it may concern:*

Be it known that I, ARTHUR T. MOORE, a citizen of the United States, residing at Batavia, in the county of Genesee and State of New York, have invented a new and useful Improvement in Box-Making Machines, of which the following is a specification.

This invention relates to improvements in machines for making paper boxes, and more particularly to machines for making boxes having two ends, one of which is secured to one end of a collar or body portion and the other of which frictionally engages the other end of the collar or body portion to form a cover for the box.

The objects of the invention are to provide a machine of this kind which is capable of automatically forming all parts of the box; also to provide a machine of this kind which assembles the several parts of the box and secures the same together so that no hand labor is necessary on making the boxes; also to provide a machine of this kind which is capable of adjustment so that the boxes will be accurately made; also to provide mechanisms of improved construction for accomplishing the various steps in the making of the boxes; also to improve the construction of machines of this type in other respects hereinafter specified.

Briefly stated, the machine shown in the drawings includes a duplicate set of mechanisms for forming the box ends, each end being formed of a flange and a head secured together and covered by a piece of binding paper or other material, a mechanism for making a cylindrical collar or body portion of the box, means for securing the collar and one of the end members together and also means for placing the other end member or cover on the collar or body portion, all of these parts of the machine being so timed that the operation of the machine is entirely automatic.

The machine shown in the drawings and herein described is particularly adapted for forming small cylindrical boxes, such as pill boxes, but it is not intended to limit the invention to such boxes, since the invention may equally well be adapted for making larger boxes and boxes of other than cylindrical shapes.

In the accompanying drawings:

Fig. 1 is an elevation showing one side of a box making machine embodying the invention.

Fig. 2 is an elevation showing the opposite side thereof.

Figs. 3 and 4 are end elevations showing the opposite ends thereof.

Fig. 5 is a top plan view thereof.

Fig. 6 is a fragmentary sectional bottom plan view thereof on line 6—6, Fig. 1.

Figs. 7 and 8 are sectional elevations on an enlarged scale on lines 7—7 and 8—8, respectively, Fig. 1, showing the gluing devices at opposite ends of the machine.

Figure 9:
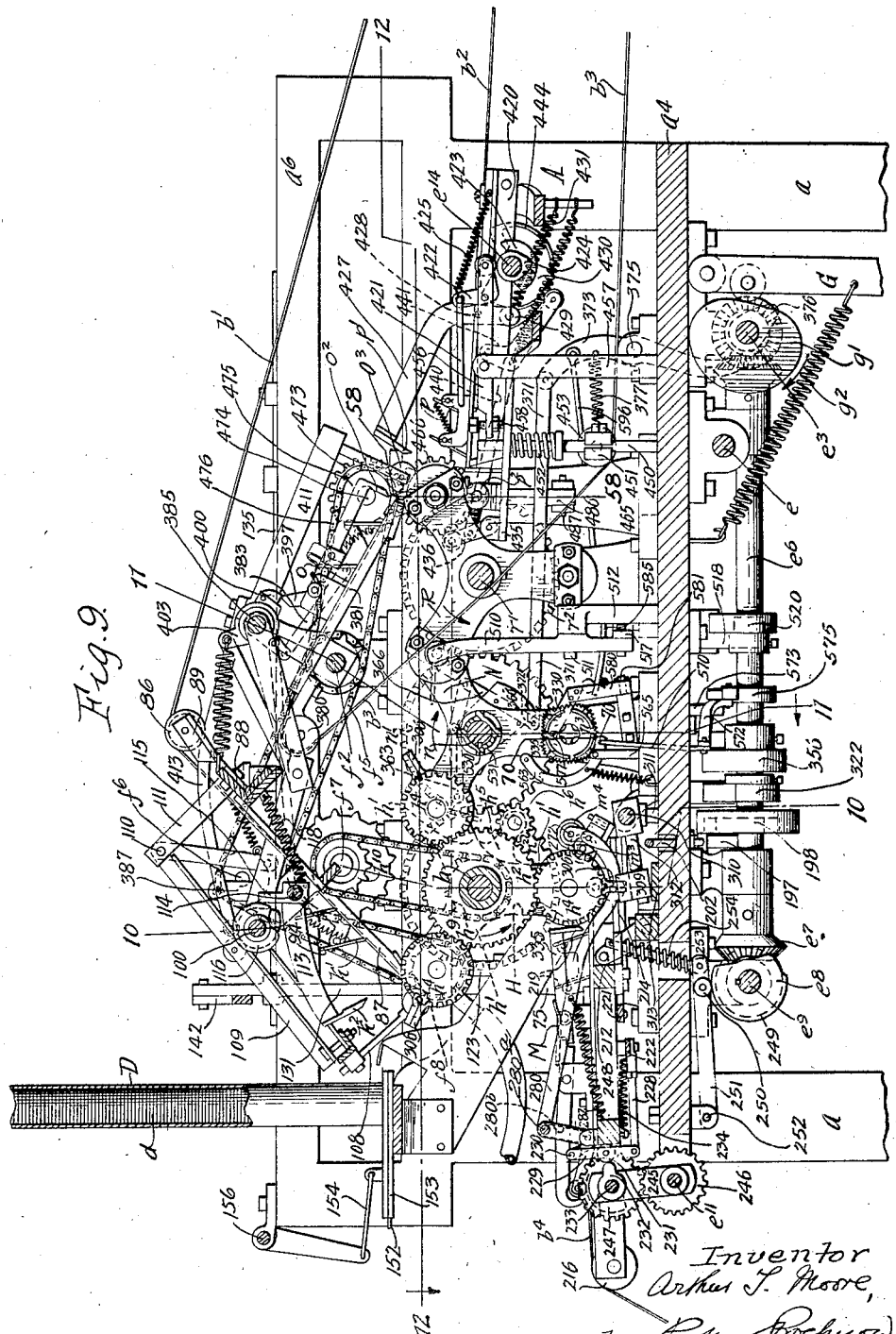

Fig. 9 is a fragmentary sectional elevation thereof on an enlarged scale on line 9—9, Fig. 5.

Figure 10:
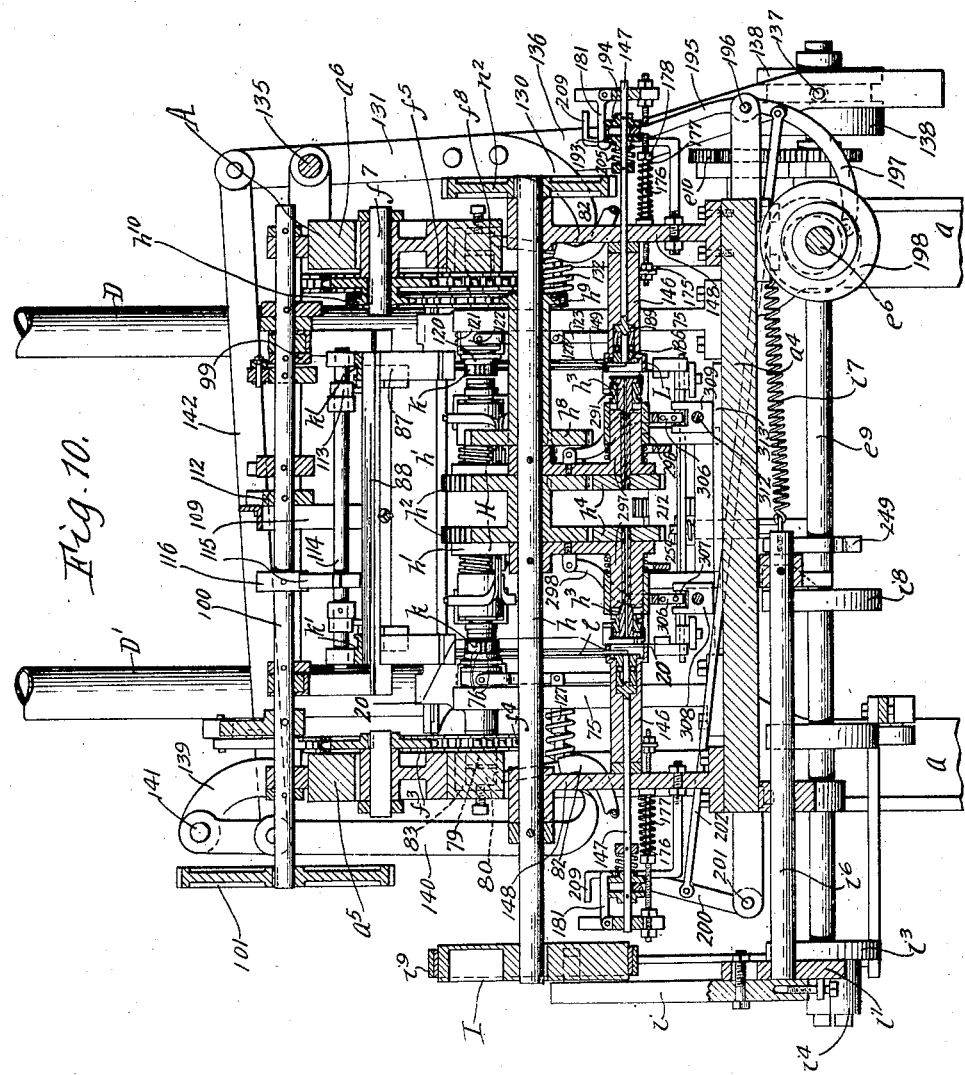
Figure 11:
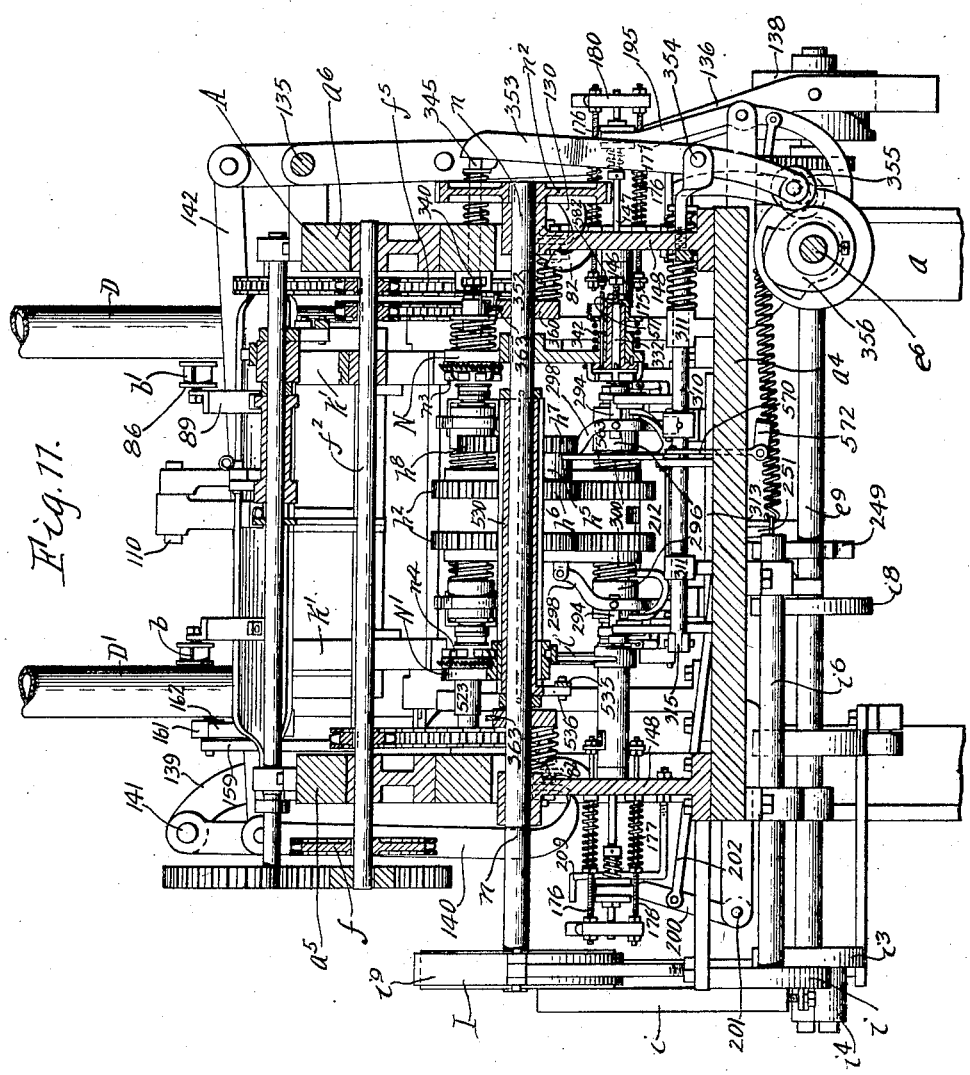

Figs. 10 and 11 are transverse sectional elevations thereof on lines 10—10 and 11—11, respectively, Fig. 9.

Fig. 12 is a sectional top plan view thereof on line 12—12, Fig. 9.

Fig. 13 is a fragmentary sectional elevation thereof on line 13—13, Fig. 5, showing on an enlarged scale the mechanism for forming the box cover and base flanges.

Fig. 14 is a similar fragmentary detail view thereof showing the parts in different positions.

Fig. 15 is a fragmentary sectional elevation showing the cutting mechanism used in connection with a flange forming mechanism.

Fig. 16 is a section thereof on line 16—16, Fig. 13.

Fig. 17 is a section thereof on line 17—17, Fig. 13, showing the mechanism for transferring the formed flange from the forming roll to the carrying arm.

Fig. 18 is a section similar to Fig. 17, showing the parts in different positions.

Fig. 19 is a perspective view of a fully formed flange.

Fig. 20 is a sectional elevation of the machine on line 20—20, Fig. 10, showing the mechanism for feeding the box heads from a magazine into a position to be assembled with the flange.

Fig. 21 is a fragmentary sectional elevation thereof on line 21—21, Fig. 20.

Fig. 22 is a fragmentary transverse sectional elevation of the machine showing the mechanism for assembling the heads and flanges.

Fig. 23 is a sectional elevation similar to Fig. 22, showing the parts thereof in different positions.

Fig. 24 is a similar section showing the mechanism for applying the binder paper to the box flange and head.

Fig. 25 is an enlarged sectional view of some of the parts shown in Fig. 24.

Fig. 26 is a section similar to a part of Fig. 22, showing the parts in position to perform another operation in the placing of the binding paper around the flange and head.

Fig. 27 is an enlarged view of a portion of the mechanism shown in Fig. 26.

Fig. 28 is a fragmentary sectional view of the arbor for holding the box end, showing another crimping roller in operative relation thereto.

Fig. 29 is a view on an enlarged scale showing the action of the crimping roller shown in Fig. 28.

Fig. 30 is a fragmentary sectional view showing some of the parts shown in Fig. 26, in different positions to force the edge of the binding paper into the flange.

Fig. 31 is an enlarged view showing the operation of forcing the edge of the binding paper into the flange.

Fig. 32 is a sectional elevation on line 32—32, Fig. 12, showing the means for feeding and applying the binding paper to the head and flange of a box end.

Fig. 33 is a view similar to Fig. 32, showing some of the mechanisms for actuating the various crimping rolls and the knife for cutting the binding paper.

Fig. 34 is an enlarged view of the means for cutting the binding paper.

Fig. 35 is an elevation on line 35—35, Fig. 12, showing the binding paper applying mechanism withdrawn from operative relation to the box end, and showing assembled flange and head moving away from the paper applying mechanism.

Fig. 36 is a perspective view of the mechanism for applying the binding paper to the head and flange of the box end.

Fig. 37 is a fragmentary plan view thereof showing means for making a fine adjustment of the crimping roll to insure an accurate placing of the binding paper on the head and flange.

Fig. 38 is a sectional bottom plan view thereof on line 38—38, Fig. 35.

Fig. 39 is a fragmentary perspective view showing the mechanism for actuating a movable sleeve or collar on an arbor for tucking the binder paper into the flanges of the ends of the box.

Fig. 40 is a sectional view through the flange of a box end showing the manner of securing the binding paper thereon.

Fig. 41 is a perspective view of a box end after the binding paper has been applied to the flange and head thereof.

Fig. 42 is a fragmentary sectional elevation of the machine on line 42—42, Fig. 12, showing the means for removing the box base from the base forming arbor.

Fig. 43 is a view thereof similar to Fig. 42, showing the parts in different positions.

Fig. 44 is a similar view thereof showing the box base removed from the base forming arbor.

Fig. 45 is a section thereof on an enlarged scale on line 45—45, Fig. 44.

Fig. 46 is a section thereof on an enlarged scale on line 46—46, Fig. 42.

Figs. 47 and 48 are longitudinal sectional elevations on line 47—47, Fig. 12, showing the mechanism for actuating the gripping arms for removing a box base from the base forming arbor, the parts being shown in different positions in the two figures.

Fig. 49 is a fragmentary longitudinal sectional view of a part of the mechanism shown in Figs. 47 and 48 showing the parts thereof in different positions.

Fig. 50 is a sectional view on line 50—50, Fig. 44.

Fig. 51 is a fragmentary longitudinal sectional elevation thereof on line 51—51, Fig. 4, showing the mechanism for feeding the board for forming the collar or body portion of the box.

Fig. 52 is an elevation of the mechanism shown in Fig. 51, illustrating means for cutting the board for forming the collar or body portion of the box.

Fig. 53 is a similar view thereof showing means for pressing the layers of the collar together.

Fig. 54 is a sectional elevation thereof on line 54—54, Fig. 12, showing the mechanism for feeding the binding paper to the collar or body portion of the box.

Fig. 55 is a fragmentary elevation partly in section of the mechanism shown in Fig. 54.

Fig. 56 is a similar elevation showing the pressure and crimping rollers in operative relation to the collar or body portion.

Fig. 57 is a fragmentary sectional elevation thereof on line 57—57, Fig. 12.

Fig. 58 is a transverse sectional elevation on an enlarged scale on line 58—58, Fig. 9.

Fig. 59 is a sectional view of a part of the mechanism shown in Fig. 58, showing a pressure roller for securing the binding paper to the collar or body portion of the box.

Fig. 60 is a section similar to Fig. 59, showing a crimping roller in operative relation to the collar or body portion.

Fig. 61 is a vertical section on line 61—61, Fig. 12, showing the mechanism for removing the collar from the collar forming mandrel and at the same time pressing the binding paper against the inner face of the collar.

Fig. 62 is a perspective view of the finished collar or body portion of a box.

Fig. 63 is a transverse sectional elevation on line 63—63, Fig. 12, showing the mechanism for placing the collar into a box base.

Fig. 64 is a perspective view showing the collar or body portion assembled in a box base.

Fig. 65 is a fragmentary transverse sectional elevation of the machine showing the mechanism for assembling the cover and body portion of a box.

Fig. 66 is a longitudinal sectional elevation thereof on line 66—66, Fig. 65.

Fig. 67 is a perspective view of a completed box with cover.

Fig. 68 is a longitudinal sectional elevation on line 68—68, Fig. 12.

Fig. 69 is a longitudinal sectional elevation thereof on line 69—69, Fig. 12.

Fig. 70 is a transverse sectional view on line 70—70, Fig. 9, showing the means for removing the finished box from the gripping device therefor.

Fig. 71 is a sectional plan view on line 71—71, Fig. 70.

Fig. 72 is a section on line 72—72, Fig. 71.

The boxes which the machine is intended to make include two end portions, one of which forms the cover for the box, and the other of which forms the base thereof, these ends being alike in the construction shown. The collar or body portion of the box is glued or otherwise secured to the base of the box, and the cover is adapted to be frictionally held in telescopic engagement with the other end of the collar or body portion. Each of the end portions of the box includes a head or disk of cardboard or relatively stiff paper, a flange made of a strip of cardboard or relatively stiff paper rolled upon itself, and a strip of binding paper or other materal which serves the two-fold purpose of securing the head or disk and the flange together, and also of forming a finish for the side of the end portions. The collar or body portion of the box in the construction shown is also made of a strip of cardboard or relatively heavy paper rolled upon itself, and a strip of finishing paper is also preferably used, although if desired, this finishing strip may be omitted in the formation of the collar. The heads or disks of the ends of the box are supplied to the machine already cut, and the cardboard and binding material is supplied in long strips, preferably wound on reels, the machine being provided with means for cutting the desired lengths from these strips.

The machine shown in the drawings includes a main stationary frame A, which may be of any usual or suitable construction, and which supports the mechanisms for forming the various parts of the box and for assembling the same. This frame is supported on legs $a$ adapted to rest on a floor or other support. The machine also includes a movable frame A' which is movable toward and from the main frame. This frame carries a number of reels of paper or pasteboard from which parts of the boxes are made, and during a portion of the operation of some of the mechanisms mounted on the main frame A, the movable frame A' moves toward the main frame so as to assist in feeding the paper to the various mechanisms. During the rearward movement of the movable frame the reels are unwound to supply the desired amount of paper for the next operation of the machine. This movable frame may be of any suitable or desired construction, that shown being provided with legs $a'$ having rollers or casters $a^2$ at the lower ends therof which are movable in a guide track $a^3$. Any other means for mounting the movable frame A' so that the same is capable of moving toward and from the main frame may be employed if desired. The dotted and full lines in Fig. 1 show the positions of the movable frame at opposite ends of its path of movement. The stationary frame is preferably provided with a table or horizontal platform $a^4$ on which many of the parts of the machine are mounted and upright side portions $a^5$ and $a^6$.

The movable frame member A' supports two reels B and B' for the cardboard or heavy paper for forming the cover and base flanges respectively. The binding paper for the collar is supplied from a reel $B^2$ also supported on the movable frame member, and $B^3$ represents a reel for the cardboard from which the collar is made. $b$ represents a strip of cardboard for the cover, which is unwound from the reel B and passes to the stationary portion of the machine, and $b'$ represents the corresponding strip or cardboard unwound from the reel B'. A strip $b^2$ of binding paper or other material passes from the reel $B^2$ to the fixed portion of the machine and $b^3$ represents a strip of cardboard unwound from the reel $B^3$ for use in forming the collar. All of these strips of material, after being unwound from the reels, pass over gluing rollers $c$ of a glue container C, Fig. 8, mounted on the movable frame of the machine, and these rollers dip into the glue receptacles and on being turned by contact with the tapes or strips of paper or board, cover one face of each strip of material with the required amount of glue. Any suitable or desired means may be employed for keeping the glue hot, such for example, as an electric heating device $c'$ arranged below a water tank or container $c^2$ into which the glue receptacle $c^3$ extends. A glue applying device of any other suitable or desired construction may be employed. The strips of paper are guided into operative relation to the glue rollers $c$ by means of a plurality of guide rollers over which the paper passes, and which need not be herein specifically described. The strip $b^2$ after passing over the gluing roller is guided upwardly over a roller $c^8$ arranged at an elevation above the movable frame. This roller in the construction shown is arranged on a rod $c^9$ secured to a suitable overhead support.

The stationary part of the machine supports two reels $B^4$ and $B^5$ on which the binding paper or material for the flanges of the base and cover respectively is wound. Strips of binding paper $b^4$ and $b^5$ are unwound from these reels and pass over glue rollers $c^4$ of a gluing device $C'$, mounted on the stationary frame. This device corresponds substantially in construction to the glue applying device C mounted on the movable frame, and is shown in detail in Fig. 7, the device including heating means $c^5$, a water tank or container $c^6$ and a glue reservoir $c^7$ into which the rollers $c^4$ dip. Other means for applying glue or adhesive material to the strips of material may be employed if desired.

The heads or disks used in the making of the box ends may be supplied to the machine in any suitable or desired manner, a pair of cylindrical magazines D and D' being shown in the construction illustrated, which are adapted to receive stacks of disks $d$ and $d'$ for the base and cover portions respectively of the boxes.

The various mechanisms of the machine may be driven by any suitable means, power in the construction shown being supplied through the medium of a driving pulley or wheel E which is mounted on a main shaft $e$, suitably journalled in the stationary frame of the machine. This shaft has a pinion $e'$ secured thereto, Figs. 5 and 6, which meshes with a gear $e^2$ secured on a shaft $e^3$. This shaft is provided with a bevel gear $e^4$ meshing with a bevel gear $e^5$ secured on a shaft $e^6$ extending lengthwise of the frame of the machine and provided near its other end with a bevel gear $e^7$ meshing with a gear $e^8$ secured on a transverse shaft $e^9$, the shafts $e^3$ and $e^9$ rotating at the same rate of speed. The shaft $e^9$ is also connected by means of a train of gears $e^{10}$ with a transverse shaft $e^{11}$ secured to the front of the machine. The gear $e^2$ also meshes with a gear $e^{12}$, which in turn meshes with a gear $e^{13}$ for driving a shaft $e^{14}$. The main drive shaft of the machine is also provided with a sprocket wheel F which drives a sprocket wheel $f$ through the medium of a chain $f'$, the sprocket wheel $f$ being mounted on a sprocket shaft $f^2$. The sprocket shaft $f^2$ is provided at one side of the machine with a sprocket wheel driving a chain $f^3$, Fig. 1, which in turn meshes with a sprocket wheel $f^4$ arranged on the flange forming mandrel for the cover of the box. On the opposite side of the machine the sprocket shaft $f^2$ is provided with a sprocket wheel driving a chain $f^5$, Fig. 2, the two runs of which pass over sprocket wheels mounted on an idler shaft $f^6$, Fig. 5, and a sub-shaft $f^7$, Fig. 9, and the other end of the chain passes over a sprocket wheel $f^8$ secured on the flange forming mandrel for the box base. Any other driving connections may be provided if desired.

The reciprocatory movement of the frame A' with reference to the fixed frame A may be effected in any suitable or desired manner so as to properly time this movement with the operation of other parts of the machine. In the construction shown, the movable frame A' is connected by means of a link $g$ with a lever G, one end of which is pivoted on a stationary part of the frame of the machine. This lever cooperates with a cam $g'$ mounted on the shaft $e^3$ which swings the lever G about its pivot, and consequently through the medium of the link $g$, produces the desired movement of the movable frame member. The lever G is held in engagement with the cam by means of a spring $g^2$.

The box ends are partly formed on arbors which are arranged on intermittently movable arbor supporting spiders or members H secured on a shaft $h$ which is suitably journalled on the fixed frame of the machine. In the particular construction shown in the drawings, the arbor supporting spiders H are each provided with three arms $h'$ on which the arbors are mounted, the arbors of one spider extending toward one side of the machine and the arbors of the other spider extending toward the other side of the machine. The arbors of each arbor supporting spider are arranged in axial alinement with each other, and each pair of arbors simultaneously forms two box ends which are finally assembled on a collar or body portion to form the complete box. The arbor supporting spiders H are spaced apart and a pair of gears $h^2$, preferably formed integral with each other, are rotatably mounted on the shaft $h$ between the spiders H. The arbors $h^3$ are rotatably mounted on the arms of the spiders and each arbor is provided with a pinion $h^4$ meshing with a gear $h^2$, and since this gear is constantly rotating during the operation of the machine, all of the arbors will have a continuous rotary motion about their own axes, as well as an intermittent movement about the axes of the arbor supporting spiders.

The rotation of the gears $h^2$ is preferably accomplished by mechanism which is best illustrated in Figs. 9, 10 and 11, but may be effected by any other means if desired. One of the spiders H, to wit the one shown on the right side of the machine in Fig. 11, is provided with a fourth arm $h^5$ which is spaced between two of the arms $h'$ and which forms a bearing for the shaft of a pinion $h^6$, Figs. 9 and 11, which meshes with the adjacent gear $h^2$. The other end of this pinion shaft is provided with a pinion $h^7$ meshing with a gear $h^8$, see also Fig. 10, secured on an elongated sleeve rotatably mounted on the shaft $h$. The other end of this sleeve is provided with a sprocket wheel $h^9$ driven by means of a sprocket chain from a sprocket wheel $h^{10}$, mounted on the shaft $f^7$, see Fig. 9. Since the two gears $h^2$ are integral, the driving mechanism described will effect the rotation of both gears $h^2$ and of all of the arbors mounted on the arbor supporting spiders H.

The arbor supporting spiders or members are intermittently rotated so that the arbors are held successively in three different positions in which the various steps in the formation of the box ends are performed.

Any suitable means may be employed for imparting intermittent rotation to the arbor supporting shaft $h$, these means shown being constructed in accordance with my United States Patent No. 1,405,058 of January 31, 1922. This mechanism is preferably used although, if desired, any other means for imparting the intermittent rotation of this shaft may be employed. Briefly stated, this intermittent mechanism includes a radially slotted member or wheel I, Fig. 1, secured on the shaft $h$ of the arbor supporting member H, and an oscillatory arm $i$ is provided with a pin or roller, Fig. 10, adapted to engage in the slots of the member I to turn this member through a part of a revolution equal to the angle between the slots. After this turning has been completed, the arm $i$ is moved lengthwise of its pivot to withdraw the pin or roller from engagement with the slot and is moved in the reverse direction into engagement with the next slot, whereupon the operation is repeated. The arm $i$ is adjustably secured on a plate or member $i'$ having a laterally extending arm $i^2$ adapted to engage with a cam disk $i^3$ having a roller $i^4$ thereon eccentric with the disk and adapted to engage the arm $i^2$ to produce the rocking movement of the arm $i$. In the construction shown, a spring $i^5$ returns the arm $i$ into the position shown in Fig. 1, after the same has been moved by the roller $i^4$ to advance the slotted member I. The oscillatory plate or member $i'$ is mounted on a shaft $i^6$, Figs. 6 and 10, which is movable in the direction of its length to permit the end of the arm or lever $i$ to move into and out of the slots of the slotted member I, this movement being against the action of a spring $i^7$, and is effected by means of a cam $i^8$, this cam and the cam disk $i^3$ both being mounted on the shaft $e^6$. Consequently, during the operation of the machine the arm $i$ intermittently rotates the arbor supporting shaft $h$ and a band brake $i^9$ is preferably provided around the slotted disk I, and is actuated through suitable mechanism not herein described, to positively hold the arbor supporting shaft $h$ against turning while the arm $i$ moves from one slot to another.

The mechanism for forming the flange portion of the box end is preferably constructed as shown in detail in Figs. 13–18 inclusive, this mechanism being mounted on the stationary part of the frame of the machine. In these figures is shown the mechanism for forming the end of the box which eventually becomes the base thereof, and this mechanism is arranged at one side of the arbor supporting member H and is identical with the mechanism for forming the other box end which becomes the cover of the box. Consequently only one of these mechanisms will be described. This mechanism in the particular embodiment of the invention shown in the drawings includes a rotary mandrel $k$ journalled on a standard or bearing member 75 which is secured to and extends upwardly from the table $a^4$ of the main frame A of the machine. The mandrel $k$ has an enlarged hollow head portion provided with a plurality of perforations 76 and a stem 77, Fig. 17, which is journalled in the standard 75 and to which is secured the sprocket wheel $f^8$ driven from the shaft $f^2$. Other suitable means for rotating the mandrel may be employed if desired. The sprocket wheel in the construction shown is provided with a hub portion 79 which is hollow, and is adapted to form a substantially air tight joint with a non-rotatable coupling member 80, a gasket or flexible washer 81 being used for this purpose in the construction shown. The coupling member is connected by means of a hose or tube 82 to any suitable device, not shown, for producing suction within the mandrel $k$. The non-rotatable coupling member 80, in the construction shown, extends into a recess 83 in the frame member $a^6$ of the machine and is held from turning with the mandrel $k$ by means of a nipple or hose connection 84 secured thereto and connected with the suction tube 82, and the coupling member is held in engagement with the collar or gasket 81 by means of a set screw 85 extending through a threaded hole in the frame member $a^6$ and pressing against the coupling member.

The flange forming mechanism also includes a feeding mechanism $k'$ for feeding the strip of paper or cardboard $b'$ to the mandrel $k$, and a knife or cutting member $k^2$ for cutting off the desired length of paper from the strip $b'$.

The paper feeding mechanism shown in the drawings includes a guide roller 86 over which the strip $b'$ of cardboard passes, and a stationary table 87 which is suitably mounted on a frame member 88 of the machine. An extension 89 of the frame member 88 supports the guide roller 86. The strip of paper $b'$ passes along the upper face of the table 87 in such a manner that the glued face of the card-board is uppermost and out of contact with the table. The lower end of the table terminates in close proximity to the mandrel $k$ so that when the paper is fed beyond the lower edge of the table 87, it will extend over the mandrel $k$. A part of the table is cut out as shown at 90, forming a guide slot for a slidable feed member 91 which is secured to an upwardly extending portion 92 on which paper engaging fingers 93 and 94 are pivoted. A spring 95 connects these two fingers in such a way as to cause the lower ends thereof to swing into engagement with the paper feeding slide 91, and to clamp the paper against the slide in such a manner that the paper can be moved only in the direction of the arrow shown in Fig. 13. The upwardly extending part 92 of the paper feeding slide member 91 is preferably guided in its movement lengthwise of the stationary table 87 by means of one or more pins 96 extending into a slot in the stationary table 87, as shown in Fig. 16. The paper feeding slide 91 is reciprocated by means of a bell crank lever 97, one arm of which is connected by means of a link 98 with the extension 92 of the slide member, and the other arm of the bell crank lever engages a cam 99 mounted on a cam shaft 100, which is driven by means of a gear 101 secured to the cam shaft, Figs. 1 and 10. The gear 101 meshes with an idler gear 102 suitably journalled on the frame of the machine, which gear in turn meshes with a gear 103 mounted on the sprocket shaft $f^2$, Fig. 1. The lever 97 is held in engagement with the cam by means of a spring 105, and during the rotation of the cam which is shown in dotted lines in Fig. 13, the lever 97 and the reciprocating paper feeding slide 91 swing from the position shown in full lines to the position shown in dotted lines in Fig. 13. Fig. 14 shows the paper feeding slide in its advanced position, in which the end of the paper is fed into operative relation to the perforations 76 of the mandrel $k$. The suction within the mandrel will then grip the strip of paper or carboard $b'$ and due to the rotation of the mandrel, the paper or cardboard is wound upon itself. During the winding of the paper board on the mandrel, the movable frame member $A'$ moves toward the stationary frame, so that comparatively little suction is required to draw the paper around the mandrel. After the strip of paper $b'$ has been engaged by the mandrel, the rotation of the mandrel will draw the strip lengthwise of the slide 91 and the fingers 93 and 94, and during the winding of the paper upon the mandrel, the paper feeding slide 91 returns to its original position, as shown in full lines in Fig. 13.

In order to insure a good glued connection between the overlapping parts of the flange formed from the strip $b'$, a pressure roller $k^3$ is preferably employed, which, in the construction shown, is arranged on the end of an arm 108 mounted on a swinging frame 109 pivoted at 110 on a bracket or part 111 secured on the frame of the machine, and this frame has an anti-friction roller $112^a$ pivoted thereon which rests upon a cam 112 also secured on the cam shaft 100. The cam is so formed that the pressure roller $k^3$ will bear upon the paper which is being wound on the mandrel immediately after the paper has been gripped by the suction within the mandrel, and after the flange has been formed the pressure roller is moved by the cam 112 into the position shown in dotted lines in Fig. 13. The pressure roller $k^3$ is preferably so formed that only a thin edge thereof engages the glued face of the paper, so that little or no glue adheres to the pressure roller. Means of other construction may be employed if desired for pressing the layers of paper forming the flange together.

The paper for forming a flange is cut from the strip $b'$ by means of the knife $k^2$, which, in the construction shown, is rigidly secured to an arm 113, Figs. 9 and 15, secured on a rod or shaft 114, pivotally secured on the frame of the machine. Another arm 115 is also mounted on the shaft 114 and is adapted to engage with a cam 116 which is also mounted on the shaft 100. The knife $k^2$ is adapted to pass through a slot 117 formed near the end of the table 87, and a spring 118 is preferably provided as shown in Figs. 9 and 15, for drawing the knife downwardly into its cutting position and for holding the arm 115 in engagement with the cam 116. After the paper has been cut, as shown in Fig. 15, the end thereof is pressed against the adjacent layer of paper by the pressure roller $k^3$, thus forming a flange X, as shown in Fig. 19. Means of other construction may be employed for cutting the desired lengths of paper from the strip $b'$.

After the flange X has been formed on the mandrel $k$, it is transferred to one of the arbors on the arbor supporting spider H, the movement of the spider being so controlled that it will come to a stop when an arbor $h^3$ is in alinement with the mandrel $k$.

The following mechanism is preferably employed for moving the flange from the mandrel to the arbor.

120 represents a collar or sleeve mounted on the mandrel *k*, Figs. 17 and 18, this sleeve being rotatable with the mandrel and slidable lengthwise thereof. The collar or sleeve 120 is preferably provided with an annular groove, and fingers or splines 121 secured on a sleeve 122 enter into the groove so that the sleeve 120 may turn relatively to the sleeve 122. The bifurcated end of a lever 123 is pivoted at 124 on the non-rotatable sleeve 122, see also Fig. 13, this lever being pivoted at 125 on the mandrel supporting standard 75. A connecting rod or link 127 is pivoted at 128 to the lever 123, and extends through a hole in the frame member 75. The other end of this link is suitably connected with a hooked extension 130 of a lever 131, the link in the construction shown being provided for this purpose with a threaded end having a pair of nuts arranged thereon between which the bifurcated end of the hooked extension 130 engages. A spring 132 engages the standard 75 and a washer 133 engaging one of the nuts on the connecting rod, this spring normally holding the lever 123 in the position shown in Fig. 17, and the lever 131 is adapted to be moved from this position into the position shown in Fig. 18, to move the sleeve or collar lengthwise of the mandrel *k* and thus push the flange X from the mandrel *k* to the arbor $h^3$. It will be noted that during the movement of the sleeve or collar 120 to remove the flange X from the mandrel, the suction openings 76 in the mandrel are not uncovered, so that the suction or partial vacuum is not broken, since the sleeve 120 covers these openings after the flange is removed therefrom.

The means for actuating the lever 131 to swing the lever 123 on its pivot is best shown in Figs. 2, 10 and 11, from which it will be seen that the lever 131 is pivoted on a shaft 135 journalled on brackets extending laterally of the frame of the machine. The lever 131 is provided with an extension 136 which is rigidly secured thereto and projects downwardly, and the lower end of which is provided with a roller 137 engaging in a groove in a barrel cam 138 secured on the end of the shaft $e^9$. This groove is so formed as to cause the lever 131 and its extension 136 to swing so as to move the flange of a box base from the mandrel *k* to the arbor $h^3$, and in order to produce a similar movement of the mechanism for forming the box cover at the opposite side of the machine, this side of the machine is provided with a lever 140 corresponding substantially to the lever 131, and pivoted at 141 on an extension 139 of the frame of the machine. A link 142 connects an upwardly extending portion of the lever 131 with the lever 140 so that both of these levers will move simultaneously and in opposite directions. Consequently, only one cam is required to produce the corresponding movements in the mechanisms at opposite sides of the machine and the movements of the two mechanisms will always be simultaneous, and the cam is preferably so timed that the suction openings 76 in the mandrel *k* are only uncovered during a short interval of time during which the continuously rotating mandrel *k* picks up a strip of paper to form the next flange.

After the flange is placed on the arbor $h^3$ from the mandrel *k* the arbor supporting spider H is swung through a part of a revolution so as to carry the arbor with the freshly formed flange thereon into a second position, in which the head is applied to the flange by means of the strip of binding paper or other material, and at the same time another arbor moves into operative relation to the flange forming mandrel *k*. The arbor $h^3$ with the formed flange thereon in the second position is in axial alinement with a head-applying device. This head-applying device, as shown in the construction illustrated, includes a hollow head-receiving shell L having a shank 146, Figs. 22 and 23, which is slidably mounted on a rod or stem 147 which is also slidable on a standard or part 148 mounted on the table $a^4$ of the machine. The cylindrical shell L is provided with a semi-circular slot 149 through which a head is adapted to pass, and the head is moved by the shell L into engagement with the flange on the arbor $h^3$.

Any suitable or desired means may be employed for feeding the heads *d* from the magazine D through the slot 149 of the cylindrical head-receiving shell. In the construction shown for this purpose, see particularly Figs. 20 and 21, the heads are fed from the bottom of the magazine by means of an ejecting slide 152 which is movable upon a fixed base 153 arranged at the lower end of the magazine. The slide may be actuated by any suitable means for ejecting the lowest head in the magazine, the slide in the construction shown being connected by means of a link 154 to an arm 155 secured to a rock shaft 156. This rock shaft may be oscillated in any desired manner to produce the desired movement of the arm 155 and of the slide 152, the movement in the construction shown, being produced through the medium of a link 158 connected at one end with the arm 155 and at its other end with a lever 159 pivoted at 160 on a fixed part of the machine and having at its upper end an anti-friction roller 161 bearing against a cam 162 mounted on the cam shaft 100. The cam 162 is so timed as to eject a head from the magazine just at the right time for the same to be placed into engagement with the flange. The rock shaft 156 extends transversely at one end of the machine and actuates the corresponding mechanism for ejecting heads from the magazine D'.

The head after being ejected from the magazine drops onto a chute or conveyor $l$ which is arranged below the discharge end of the head feeding mechanism. This chute has an inclined bottom 170, the end of which terminates in close proximity to the slot 149 in the head-receiving shell L. The chute has a substantially upright side wall 171 extending upwardly from the base 170 and the other side wall 172 of the chute, at its lower end, is substantially parallel to the side wall 171 and at its upper end is curved outwardly as shown at 173. This curved portion of the side wall 172 extends under the discharge end of the head feeding device so that the heads which lie in substantially horizontal planes when discharged from the magazine, fall upon the curved portion of the chute and are deflected or turned so that they will slide along the curved wall 173 and pass into the space between the upright portion of the wall 172 and the wall 171, whereupon the heads will be in a vertical plane and will roll upon the base 170 through the slot 149 in the head-receiving shell L. Any other means for feeding the heads from a magazine into the head-receiving member may be employed.

After the head has been deposited in the head-receiving shell, this shell is moved axially toward the arbor $h^3$ to place the head into operative relation to the flange held on the arbor. In the construction shown for this purpose, the shank 146 of the head-receiving shell has laterally extending arms or projections 175 to which rods 176 are secured, see Figs. 11, 22 and 23. These rods extend through holes in the standard 148, and springs 177 are arranged on these rods, each spring bearing at one end against a collar 178 on the rod, and at its other end against the standard 148, so that these springs tend to keep the head-receiving shell in its inner position, as shown in Figs. 10 and 23. The end of each rod 176 is provided with an arm or lateral extension 180 suitably secured thereto and having a hooked lever 181 pivoted thereon at 182.

The shank 146 of the head-receiving shell L is provided adjacent to the shell with a cavity or bore 185, and a rotable cap 186 is adapted to extend partly into the bore 185 and partly into the enlarged opening in the shell L, the cap being adapted to engage the head $d$. Within the reduced bore 185 is arranged a bearing 187 cooperating with a cylindrical bearing member 188 and the stem 147 is provided with an enlarged portion or flange 189 also arranged within the bore of the shank 146 of the head-receiving shell. The rotary cap 186 is rotatable about the end of the stem 147 so that this cap is free to rotate with the head while pressing the head against the rotary arbor $h^3$. For this purpose the end of the stem or rod 147 is provided with an annular groove into which the ends of one or more pins 190, secured on the cap 186, extend. This pin merely holds the cap in place on the end of the stem, the bearing described transmitting the pressure of the collar 189 on the stem to the cap. The rod or stem 147 may be moved in the direction of its length to press the cap 186 against the arbor $h^3$, and for this purpose, in the construction shown, the stem 147 is provided with a pair of collars 193 and 194 between which the bifurcated end of a lever 195 engages. This lever, as shown best in Fig. 10, is pivoted at 196 on a fixed part of the frame of the machine, and an arm 197 of the lever is provided at its end with an antifriction roller engaging a cam 198 arranged on the shaft $e^6$, this cam being adapted to swing the lever 195 about its axis to cause the stem 147 to move inwardly so that the rotary cap 186 will press the box head against the arbor $h^3$. The corresponding mechanism at the other side of the machine is actuated by means of a lever 200 which corresponds to the lever 195, and which is pivoted at 201 on the fixed part of the frame of the machine. This lever is connected by means of a link 202 with the lever 195 so that when the lever 195 is swung about its pivot, a corresponding movement is imparted to the lever 200.

The collar 194 is rigidly secured to the stem 147 and the other collar is loosely mounted thereon, and a compression spring 205 is arranged between this collar and another fixed collar 206 secured on the stem 147. This spring causes the lever 195 to exert a yielding pressure on the stem 147 so that the rotary cap 186 presses yieldingly against the head to hold the same against the arbor $h^3$.

In moving the head toward the collar on the arbor, it is desirable to retain the head in the head-receiving shell L until the head is held in its proper relation to the flange on the arbor $h^3$, and consequently, the head-supporting member is first moved with the rotary cap 186 toward the arbor $h^3$ and after the head is pressed against the arbor, the head-supporting shell is withdrawn by means of the springs 177 acting on the rods 176. In order to accomplish this result, the hooked lever 181 is so formed that the hooked end 208 thereof normally engages the collar 193, as shown in Fig. 10. Consequently, when the lever 195 moves the stem 147 lengthwise, the collar 193 engaging the hooked lever will cause the rods 176, and consequently the head-receiving shell L, to move with the rotary cap 186. When the rotary cap is moved practically into position to hold the head against the arbor $h^3$, the hooked lever 181 engages a stop 209 rigidly secured on the standard 148, which causes this lever to swing on its pivot, as shown in Fig. 22, thus releasing the rods 176 and permitting the springs 177 to move the same and the head-receiving shell L back to its original position. The parts will then occupy the positions shown in Fig. 23, in which the head-receiving shell is back in its normal position and the rotary cap presses the head against the arbor $h^3$. Any other means may be employed for feeding the heads to the arbors $h^3$.

After the head has been placed into engagement with the arbor $h^3$, and into operative relation to the flange X arranged thereon, thest two parts of the cover are ready to be secured together by means of the binding or covering strip $b^4$. In the particular construction shown in the drawings, the binding or cover strip is applied to the head and flange by means of a binding strip applying mechanism M, which mechanism includes a paper feed device $m$ resembling somewhat the paper feed mechanism $k'$ used in connection with the forming of the flange X, a knife $m'$ which cuts the desired length from the strip $b^4$, and a series of crimping or pressing rollers $m^2$ $m^3$ and $m^4$. This mechanism is best shown in Figs. 9 and 32-36 inclusive, and includes a table or support 212 which is of sufficient width to carry the mechanisms for applying the binding strips $b^4$ and $b^5$ to both end members of the box, but for the purpose of simplifying this description, only the mechanism for applying the binding strip to the cover end members is shown, it being understood that the mechanism for applying the binding strip to the base member is mounted on the opposite side of the table 212 but otherwise is identical with the mechanism shown. The table 212 has a groove or recess 213 through which the strip of paper $b^4$ passes, and an extension 214 on which the crimping rolls are mounted. The strip of paper $b^4$ passes to the table 212 over a pair of guide rollers 216 and 217, Figs. 32 and 33. The paper advancing mechanism $m$ includes a movable slide 218 arranged in the slot 213 and co-operating with paper engaging fingers similar to the fingers 93 and 94 employed in connection with the feeding of the strips of paper or cardboard for forming the flanges of the box ends. The movable slide member 218 with which the paper-retaining fingers 219 engage, is rigidly connected with a slide 220 arranged in a groove in the side of the table 212. This slide member may be of any suitable or desired construction, and may be reciprocated in any desired manner for advancing the paper, the mechanism used for this purpose being adapted to impart reciprocatory movement simultaneously to both slide members for feeding the strips $b^4$ and $b^5$.

The slide reciprocating mechanism shown in the drawings, see particularly Figs. 36 and 38, includes a pair of levers 221 and 222 arranged below the table 212 pivoted respectively at 223 and 224 on fixed portions of the table, and the opposite ends of these links are connected with downwardly extending projections 225 and 226 respectively of the slide members for the two reciprocating mechanisms. These two levers are connected by a connecting link 227 and a cam actuated link 228, see also Figs. 9 and 35, connects the slide-engaging lever 222 with a cam lever 229 pivoted at 230 on a fixed part of the table 212. The lever 229 has an anti-friction roller 231 pivoted thereon which engages with a cam 232 mounted on the cam shaft 233. A spring 234 also connects the lever 221 with the table 212 and acts on the lever 221 in such a manner as to press the roller 231 of the lever 229 into engagement with the face of the cam 232. During the rotation of the cam, the link 228 is pushed to the right in Fig. 38, causing the two levers 221 and 222 to extend into substantially parallel positions, shown in dotted lines in this figure. The levers remain in this position only for an instant, during which time the paper is fed into operative relation to the box flange and head and the lever is then returned to the position shown in full lines on Figs. 36 and 38.

The knife for severing the strip of binding paper, after a sufficient length thereof has been fed to the box end, is mounted on an arm or lever 235, pivoted at 236 on a bracket 237 secured to the table 212, see particularly Figs. 9, 12 and 35, and the other end of this arm or lever is adapted to be engaged by the end of a cam actuated lever 238 pivoted at 239 on a bracket 240 also secured on the table 212. The end of the lever 238 engages with a cam 241 also mounted on the cam shaft 233. A spring 242 arranged about the pivot 239 presses downwardly on the knife lever 235 so that when this lever is released by the cam actuated lever 238, the spring moves the knife lever in a direction to cause the knife $m'$ to sever the paper. Other means for cutting the desired lengths of paper may be employed if desired.

One end of the table 212 is supported from the fixed frame of the machine by means of a link 245 pivoted at one end on the shaft $e^{11}$ of the main frame, see Fig. 9, and at its other end on the cam shaft 233, and gears 246 and 247 mounted on the shafts $e^{11}$ and 233 respectively impart rotary motion to the cam shaft. The other end of the table is connected with the fixed frame of the machine by means of a link 248, the links 248 and 245 not being parallel to each other, so that a combined swinging and longitudinal movement is imparted to the table when links are swung about their pivots. Any suitable means may be provided for moving the table into its various positions, a cam 249 being provided for this purpose in the construction shown, which is mounted on the shaft $e^9$ of the main frame of the machine, and which engages a roller 250 mounted on a lever 251, one end of which is pivoted at 252 on the frame of the machine. The other end of the lever is connected with the table 212 by means of a coil spring 253 which is held in operative relation to the table by means of a pin 254 pivotally secured to the end of the lever 251 and extending through the spring and having a sliding connection with the table 212. The spring interposed between the cam lever 251 and the table 212 insures a yielding engagement between the various crimping rollers mounted on the table 212 with the box.

The paper is fed into operative relation over the first crimping roller $m^2$ by the paper feed mechanism immediately after the head has been placed against the end of the arbor $h^3$. The crimping roller $m^2$ and the binding paper which extends over the same are raised into operative relation to the box head and flange on the arbor, the raising of these parts being effected through the medium of the cam 249, as described. The rotation of the arbor $h^3$ causes the binding paper to be immediately wound on the head and flange on the arbor, and owing to the fact that both the outer surface of the flange on the arbor and the surface of the binding paper engaging the same are coated with glue, these two parts will adhere securely together, so that the rotation of the arbor will wind the binding paper around the flange and head and also draw the paper over the paper feed table 212 until the paper is cut.

The first crimping roller $m^2$ is preferably arranged and constructed as follows:

The roller $m^2$ as shown best in Figs. 24, 25, 35, 36 and 37, is provided with a flat face adapted to engage a part of the flange of the box end, and an annular recess 256 into which the edge of the head $d$ is adapted to enter. I have found that in order to wrap the binding paper around the flange and edge of a head evenly and without wrinkling, the annular recess 256 in the first crimping roller must be so formed that the binding material will not be tightly pressed into the annular edge between the head and the flange, the pressing of this portion of the paper into the proper relation to the meeting edges of the flange and head being preferably effected later by means of a finishing crimping roller.

The crimping roller $m^2$ is provided with a part which presses the edge of the binding material against the outer flat face of the head of the box end, and to allow for variation in the thickness of material and other inequalities in the heads $d$, I provide a disk 257 which is loosely mounted on the same rod or pin 258 on which the first crimping roller $m^2$ is also pivoted, and a spring 259 presses this disk toward the crimping roller. The outer edges of the disk 257 engage the side edge portion of the binding paper and press the same inwardly against the head, and owing to the spring 259, a substantially uniform pressure will be exerted by the disk 257, regardless of variations in the heads $d$. This spring also enables the disk 257 to yield when two thicknesses of binding material overlap. It will be noted that the disk is approximately the same in diameter as the crimping roller $m^2$, and by this provision a smooth preliminary application of the edge of the binding strip to the box head is ensured. In order to enable this disk to move into engagement with the head of a box against the action of the spring 259, the inner face of the disk is preferably bevelled as shown at 260. The bearing pin 258 on which the first crimping roller is mounted is secured to a block or support 261 pivotally mounted on the extension 214 of the table 212, the block in the construction shown being adjustable about the axis of a pin 262, see Fig. 37, which forms the connection between the block and the table extension 214. The block is preferably provided with an arm or pin 263 extending outwardly therefrom, and an adjusting link 264 is connected at one end with the arm 263 and the other end thereof is threaded and may be held by means of nuts in different relations with respect to an outwardly extending lug $264^a$, Fig. 36, arranged on the table 212. Consequently, by adjusting the nuts so as to move the rod in one direction or another, the supporting block 261 may be set in various angular relations with reference to the binding strip $b^4$, whereby this strip can be rolled on the box end so that the two meeting or overlapping ends of the binding strip are in alinement.

After the binding strip has been applied to the box end by the first crimping roller $m^2$, the second and third crimping roller $m^3$ and $m^4$ respectively are simultaneously moved into engagement with the box end to perform further operations in the application of the binding paper to the box end. The crimping roller $m^3$ has an enlarged flange 266 which as shown in Fig. 27, turns the inner edge of the binding paper inwardly into a position to be tucked or folded against the inner face of the flange. The finishing roller $m^4$ has a slot 267 into which the edge of the head $d$ of the end enters and which presses the binding paper into engagement with the meeting edges of the head $d$ and flange X, as shown in Fig. 29, to give the box end a finished appearance, and to form a secure connection between the end and the flange, and this finishing roller also has an extended flange 268 of larger diameter than the body portion of the roller, which presses the edge of the binding material flatly against the outer face of the head of the box end, so that the finishing roller $m^4$ securely presses the binding or finishing material around the edge of the head of the box.

Both of the rollers $m^3$ and $m^4$ are preferably mounted on a frame 270 which is pivotally mounted on a bracket or projection 271, Figs. 32 to 36, extending upwardly from the extension 214 of the table 212. The finishing roller $m^4$ is pivoted on a pin 272 secured on the end of the swinging frame 270 and this frame has an extension 273 on which an arm 274 is mounted. This arm is pivoted at one end on the extension 273 and to the other end of this arm the roller $m^3$ is journalled. The swinging frame 270 has another extension 275 rigidly secured thereto, the end of which extends opposite to the axis of the roller $m^3$, and a compression spring 276 is arranged between this extension and the crimping roller $m^3$. This spring tends to move the roller $m^3$ in a direction to cause the flange of the roller $m^3$ to engage the outer edge of the box base flange, a stop pin 278 being shown in the drawings to limit the extent to which the arm 274 is swung by the spring. The flange 266 of this roller is preferably bevelled at its edge portion, as is clearly shown in Fig. 27, and consequently this crimping roller may cooperate with the flanges of varying size, since the spring 276 holds this flange yieldingly against the ends of the box flanges. The bevelling of the flange 266, together with the spring 276, enables the machine to operate successfully on box ends, even though there is considerable variation in the side of the flanges thereof.

The swinging of the frame 270 on which the crimping rollers $m^3$ and $m^4$ are mounted, to move these rollers into and out of their operative positions may be effected in any desired manner. In the construction shown for this purpose, a curved link 280 is connected at one end of the swinging roller supporting frame 270, and the other end of this link is secured to a shaft 280$^a$, to which shaft the other link 280 of the mechanism for forming the box covers is also secured. This shaft is supported from the table 212 by two arms 280$^b$ which are preferably secured to the shaft and pivoted to the table and the movement of the shaft 280$^a$ and arms 280$^b$ about the pivotal connection of the arms with the table is preferably accomplished by means of a bell crank lever, Fig. 12, pivoted on the table 212 and having an arm 281 engaging the shaft 280$^a$ and an arm 283 which rests on a cam 284 mounted on the cam shaft 233, the cam being so formed as to cause the links 280 to move the swinging frames from operative position, shown in Fig. 33, to an inoperative position shown in Figs. 32, 35 and 36, the movement of the curved links 280 in the opposite direction being effected by means of springs 285 connecting the links 280 with the table 212. These springs also serve to hold the arm 283 of the bell crank lever in engagement with the cam 284. The link 280 is provided with a downwardly extending curve so that the link will not interfere with the movements of the arbors $h^3$ into and out of their second position. Any other means for moving the swinging roller supporting frame 270 into and out of its operative position may be employed if desired.

After the binding paper applying mechanism M has completed its operation on the box end, the same will appear as shown in Fig. 29, the inner end of the binding paper projecting toward the axis of the box end. The mechanism for turning this projecting end inwardly against the inner face of the flange X will now be described.

The arbor $h^3$ is made in two parts, a part 290 engaging the head of the box end and the inner portion of the flange, and a sleeve or part 291 is slidably arranged on a shank or reduced portion 292 of the part 290 of the arbor. When the sleeve 291 is in its normal position, as shown in Figs. 30 and 31, it forms substantially a continuation of the part 290 of the arbor and helps to support the flange. The arbor sleeve 291 is provided with an annular groove 293, and the ends of splines or fingers 294, Figs. 11, 30 and 42, enter this groove. These fingers are secured to a sleeve 296 mounted on a lug or projection 297 of the arm $h'$ of the spider. The sleeve 296 is non-rotatable and the fingers or splines 294 form a connection between this sleeve and the rotatable sleeve 291. A lever 298 pivoted at 299 on the spider arm $h'$ is also connected with the sleeve 296 and is adapted to move the same rearwardly against the action of a spring 300, thus carrying with it the rotary sleeve 291 into a position shown in Fig. 26. The rotary sleeve is drawn into the position shown in Fig. 26, while the crimping roller $m^3$ acts on the box end, and immediately after this crimping roller has moved out of engagement with the box end, the rotary sleeve 291 is again moved back into its normal position as shown in Figs. 30 and 31, thus pressing the radially extending edge of the binding paper inwardly against the inner face of the flange of the box end, whereupon the box end is completed.

The lever 298 for moving the non-rotatable sleeve 296 to effect the turning in of the binding paper as just described, may be moved against the action of the spring 300 by any suitable means, those shown being best illustrated in Fig. 39, which shows means for simultaneously actuating the two levers of the oppositely disposed arbor supporting siders. These levers are provided with curved portions 305 which extend around the non-rotatable sleeves 296, and the lower ends 306 of the levers during the intermittent rotation of the arbor supporting spiders are adapted to enter into recesses 307 of blocks 308 and 309 respectively, the ends 306 of the levers remaining in the recesses while the arbors $h^3$ are in their second positions, the levers being held in their normal positions by means of the springs 300. After the crimping rollers have completed their operations on the box ends, these blocks 308 and 309 are moved toward each other into the position shown in dotted lines in Fig. 39, thus causing these levers to swing against the actions of the springs 300. The mechanism for moving these blocks toward and from each other preferably includes a rod 310 which is slidable through guide blocks or bearings 311 arranged on a stationary part of the frame of the machine, and an arm 312 extends outwardly from the rod 310 and is rigidly secured to the block 309. The other block 308 is secured to one end of a lever 314 pivoted intermediate of its ends on a fixed part of the machine and having its other end pivoted at 315 to the slidable rod 310. Consequently, it will be seen that when the rod 310 is moved to the left in Fig. 39, to move the block 309 into the dotted line position, the block 308 will move in the opposite direction, due to the action of the lever 314. The blocks rest on a strip or plate 313 secured on the table $a^4$ of the machine and are thus free to be moved by the arm 312 and the lever 314. A spring 317 normally holds the sliding rod 310 in its normal position indicated by full lines in Fig. 39. In order to move this rod 310 against the action of the spring 317, a lever 320 is employed which engages the end of the rod 310, see also Fig. 2. This lever is pivoted at 321 on a fixed part of the frame of the machine and the end thereof engages a cam 322, also shown in Fig. 9, this cam being mounted on the shaft $c^5$. This cam is so formed as to swing the lever 320 about its pivot at the correct time to cause the blocks 308 and 309 to move toward each other, and thus swing the levers 298 about their pivots to effect the folding or tucking in of the binding strips against the inner faces of the flanges of the box ends. Other means for accomplishing the swinging of these levers may be employed if desired.

After the operation described on the box ends, the same are completed as shown in Fig. 41. X' represents the box end which forms the cover of the box, and which is formed on one side of the machine, and $X^2$ represents the box end which forms the base of the box. Fig. 40 shows the binding paper as applied to the flange of the box end, two thicknesses of binding paper overlapping at $x$ at the portion of the flange of the box adjacent to an edge of the paper forming the box flange. By means of this arrangement the edge of the pasteboard forming the box flange will not be nearly as noticeable as in box ends ordinarily made, so that the boxes made in accordance with this invention are extremely neat in appearance. The placing of the overlapping edges of the binding material in the particular position shown is effected by a correct positioning of the cams, and other parts of the machine. After the box ends have been completed, the arbor supporting spider shaft $h$ is turned through another part of a revolution, so that the arbors carrying the completed box ends are placed into a third position with reference to the axis of the arbor shaft. In this position the finished box ends are removed from the arbors $h^3$ by means of gripping devices arranged on a shaft $n$ which is suitably mounted on the frame of the machine parallel to the shaft $h$. This shaft carries at one side a three armed spider N rigidly secured thereto, and at the other end thereof a single arm N' is pivotally mounted. This shaft $n$ is rotated in the opposite direction from the shaft $h$ and for this purpose one end of the shaft $n$ is provided with a gear $n'$ which meshes with a gear $n^2$ secured on the end of the shaft $h$. The spider N and arm N' are arranged so that the gripping devices, generally characterized by $n^3$ and $n^4$ respectively, will come to a stop while in axial alinement with the arbors $h^3$ of the shaft $h$ when these arbors are in their third positions. These gripping devices may be of any suitable or desired construction, the gripping devices $n^3$ for the bases of the boxes being shown in the drawings in detail in Figs. 42–46 inclusive, and since the gripping device on the arm N' is similar in construction to the gripping devices mounted on the spiders N, only one of the gripping devices $n^3$ of the spider N will be described in detail.

Fig. 42 shows the gripping device $n^3$ immediately after an arbor $h^3$ has moved into the third position. The gripping device includes a disk portion or head 325 preferably formed integral with a hollow stem 326 which is journalled in an arm of the spider N, but which is held against turning relatively to the arm by means of a pin 327 or other suitable means, the pin shown extending into the disk 325 and being slidably arranged in a hole in the arm of the spider N. The disk portion 325 forms a head on which the gripping devices are mounted and together with its stem is slidable from the position shown in Fig. 42 into that shown in Fig. 43. The head 325 of the gripping device forms a support for a plurality of segmental jaws or gripping members 330 which are so formed as to engage the flange of the box end, and the inner edges of which are adapted to engage the head of the box end. Each jaw is rigidly secured on a pin 331 which is slidable lengthwise in a hole arranged radially in the gripping device head 325. These arms are movable radially in the head and carry the jaws with them in their movements.

The outward movement of the radial pins may be effected in any desired manner, a cam rod 332 arranged within the sleeve 326 being for this purpose provided at its end with a plurality of cam faces 333 with which the inner ends of the pins 331 engage. The outward movement of the pins by the cams is opposed by means of a spring 335 which extends completely around the head and engages the outer portions of the jaws 330. This construction is most clearly illustrated in Figs. 45 and 46, in which Fig. 45 shows the cam end of the rod 332 in position to permit the spring 335 to move the jaws toward each other or into their inner positions in which they grip the flanges of the box ends, and Fig. 46 shows the jaws in their outer positions in which they may pass over or around the heads of the box ends. The cam rod 332 may be turned into one of another of the two positions shown in Figs. 45 and 46, by means of a cam rod arm 336 secured to the cam rod and extending through slots in the sleeve 326.

In the particular construction shown, the mechanism for moving the gripping devices toward and from the arbors for the box bases is constructed differently from the mechanism which moves the corresponding gripping device toward and from the arbors for the box covers.

In order to move the gripping devices which cooperate with the box bases toward and from the arbors $h^3$ to take the bases therefrom, the cam rod 332 is provided with a stem or extension 340, that shown being in the form of a bolt threaded at one end and engaging in a threaded hole in the cam rod. This threaded end of the stem is also provided with a nut 341 whereby a thimble 337 may be held axially with reference to the cam rod 332. The thimble, cam rod and sleeve 326, and consequently also the gripper head 325, are normally held in the position shown in Fig. 42 by means of a spring 342 interposed between a flange on the thimble and the arm of the spider N.

The movement of the gripping devices out of this position and into a position to engage the box end, in the construction shown, is effected by means of a push rod 345, which is slidably mounted in the frame of the machine and the end of which is rigidly secured to a head 346 which is formed with an undercut slot 347 into which the head 348 of the bolt or extension 340 is adapted to enter as the gripping member moves into alinement with the arbor $h^3$, see also Fig. 50. This connection between the push rod 345 and the gripping mechanism permits the cam rod 332 and the extension 340 thereof to turn relatively to the push rod 345 to actuate the jaws of the gripping device. The push rod 345 is normally held in its outer position shown in Fig. 42, by means of a spring 352 which also serves to assist the spring 342 to return the gripping device to the normal position shown in Figs. 42 and 44.

The push rod, in the construction shown, is pushed inwardly by means of a lever 353, Figs. 11 and 12, pivoted at 354 on a bracket or part secured to the frame of the machine. The lever is provided at one end with an anti-friction roller 355 engaging a cam 356 mounted on the shaft $e^6$, Figs. 6 and 11. This cam is so timed that soon after the arbor $h^3$ moves into its third position, the gripping device is pushed inwardly through the medium of the push bar 345, as shown in Fig. 43, to grip the box end, and after the box end has been grasped by the jaws, the gripping device is withdrawn as shown in Fig. 44, pulling the box end from the arbor $h^3$. In order to prevent the box ends from being held on the arbors by suction which would be produced in withdrawing the box end, these arbors $h^3$ are preferably provided with longitudinal holes 357 extending through the stems of the arbors and terminating at the outer faces thereof, see Figs. 22, 23, and 26.

The mechanism for engaging the cam rod arm 336 for turning the cam rod 332 to control the radial movement of the gripping jaws into and out of engagement with a box base, is preferably constructed as follows:

The spider N on which the box end gripping devices are mounted, in the construction shown, moves these devices into three positions, the first position being the one in which the completed box base is taken from the arbor $h^3$ and the third one being the one in which the box base is released from the gripping devices. In the first and third positions, the cam rod arms 336 of the gripping devices are actuated to move the jaws, the arms being actuated in such a manner as to close the jaws while the gripping device is in the first position to cause the same to grip a box base and to open the jaws when the gripping device is in the third position, to release the box base. The mechanism shown for this purpose includes a stationary guide member 360, Figs. 47 to 49, which is mounted on the shaft $n$, but is held against turning with this shaft by means of a bracket or part 361 secured to the frame of the machine. This guide member is provided with an upper face 362 having a guide groove or slot therein in which a link 363 is slidably arranged. This link is provided at its outer end with a pin 364 adapted to engage a cam rod 336 of a gripping device in the first position. This link is moved lengthwise of the groove in the guide member by means of a lever 366 arranged in a recess or slot in the guide member 360 and pivoted at 367 on the guide member, the upper end of the lever being connected by means of a link 368 with the sliding link 363. 369 and 370 represent stop pins arranged in the guide member 360 and extending through the recess or slot therein for limiting the movement of the lever 366 about its pivot 367, and the lower end of this lever is connected to a shifting link 371 by means of a pin 372, this pin extending beyond the lever and arm into a position to engage any of the cam rod arms 336 when in the third position. The shifting link 371, see Fig. 9, is connected at its other end to a cam actuated lever 373, see also Fig. 2, pivoted at 375 on a fixed part of the frame of the machine, and the lower end of the lever engages a cam 376, a spring 377 holding this end of the lever against the face of the cam which is mounted on the shaft $e^3$.

The operation of this mechanism will be evident from Figs. 47–49, Fig. 47 showing the positions of the parts immediately after the spider shaft $n$ has been turned through a part of a revolution, the same position of the parts being also shown in Fig. 42. The mechanism is then actuated so that the parts thereof occupy the positions shown in Fig. 48 and the gripping device is then moved axially by means of the lever 353, as has been described. This brings the cam rod arm 336 into operative relation to the pin 364 and the mechanism is then actuated to move this pin to the right as shown in Fig. 49, swinging the arm 336 from the position shown in Fig. 48 to that shown in Figs. 43 and 49. At the same time that the pin 364 moves to the left, as shown in Figs. 47 and 48, the lower pin 372 moves to the right, and this swings the cam rod arm 336 in the third position, to the right, as shown in Fig. 48, thus releasing the box base.

The corresponding mechanism which is employed on the opposite side of the machine on which the box covers are made is substantially identical with that described, except that the pin 372 is omitted from the mechanism on the cover side of the machine for the reason that this mechanism acts only on the cam rod arm while the gripping device on the arm N' is in the first position.

The box base, after having been gripped by the gripping device $n^3$, is carried from the first gripping position to the second position, and while in this position the collar or body portion of the box is inserted within the flange of the box base. The mechanism for forming the collar or body of the box, in the construction shown, is mounted on the stationary frame of the machine near that end of the machine which is nearest to the movable frame member A'. This mechanism may be of any suitable or usual construction, that shown in Figs. 51 to 60 being made as follows:

The strip of cardboard or other material from which the collar or body portion of the box is made, passes from a roller 380 on to a fixed table 381 having a paper feeding device $o$ slidably mounted thereon. This paper feeding device corresponds in construction with those used in connection with feeding strips of cardboard and binding material for forming the flanges of the box ends, and will, therefore, not be again described. The sliding paper feed device shown is connected by means of a link 383, Fig. 51, to an arm 384 pivoted on a shaft 385. The arm 384 is also connected with a link 386 pivoted to one end of a lever 387, this lever being pivoted at 388 on a fixed part of the machine, and is provided intermediate of its end with an anti-friction roller 389 cooperating with a cam 390 secured on a shaft 100. Arranged adjacent to the lower end of the fixed inclined table 381 and rotatably mounted on a part of the fixed frame of the machine, is a suction mandrel $o'$ having holes or openings in a portion of the periphery thereof, and at the proper time the paper feed member $o$ moves the cardboard forwardly into operative relation to the suction openings in the mandrel $o'$, as shown in Fig. 51. The rotation of the mandrel $o'$ causes the cardboard to be wound upon the mandrel and during the winding of the cardboard on the mandrel, the paper feeding slide $o$ returns to its initial position.

$o^2$ represents a knife for severing the strip $b^3$ to supply the desired length of cardboard to the mandrel. This knife is mounted on a lever 395, Figs. 52 and 53, pivoted at 396 on a part of the fixed table 381. The lever has a short arm 397 which, in the construction shown, cooperates with a dog or latch 400 pivoted on an arm 401, which forms a part of the sleeve or collar 402, rotatably mounted on the shaft 385. This collar or sleeve has another arm 403 which is connected with a link 404, the end of which cooperates with a cam 405 mounted on the cam shaft 100. A spring 406 holds the end of the link 404 in engagement with the cam.

When the cam has moved the parts into the position shown in Fig. 52, the dog or latch 400 is moved out of engagement with the short arm 397 of the knife lever, so that a spring 408 arranged about the pivot 396 of the knife swings the knife downwardly to cut the strip of paper. The dog or latch 400 is preferably spring actuated, and upon the return movement of this mechanism, the spring held dog again engages with the arm 397 of the knife lever to swing this lever against the action of the spring 408.

A pressure roller is also preferably provided for holding the paper in engagement with the mandrel, and in the construction shown, a roller $o^3$ is provided for this purpose, which is mounted on an arm 410 secured on a lever 411 pivoted on the shaft 385. This lever is provided with another arm 413 engaging with a cam 415 also mounted on the cam shaft 100. This pressure roller is preferably provided with a relatively sharp or V-shaped edge which engages the glue-covered face of the paper without removing the glue therefrom.

During a part of the operation of winding the cardboard on the mandrel to form the collar or body portion of the box, the binding or finishing paper $b^2$ for the collar or body portion is also applied to the cardboard. By performing parts of these operations simultaneously, a strong collar is obtained and there is no tendency of the collar to unwind during the process of making the same. In the placing of the binding paper on the collar, the glued surface of the binding paper is applied to the glued surface of the cardboard, which ensures a secure adhesion between these parts of the collar. The binding or finishing paper, after being applied to the cardboard of the collar, positively prevents unwinding of the cardboard from the mandrel and the parts of the machine are preferably so organized and timed that the overlapping parts or edges of the binding paper will lie adjacent to the edge of the cardboard, to produce a finished appearance of the collar.

The binding or finishing paper is fed to the mandrel $o'$ by means of a feeding mechanism including a stationary or fixed table 420 having a sliding paper feed device $p$ mounted thereon, Figs. 54 and 57, similar to that heretofore described in connection with other parts of the machine. This paper feeding slide device is moved lengthwise of the table 420 by means of a link 421 connecting with an arm of a cam lever 422, the other arm of which cooperates with a cam 424 arranged on the shaft $e^{14}$, see Figs. 9 and 54. A spring 425 holds the lever in engagement with the cam. The binding paper is cut to the desired length for covering the pasteboard portion of the collar by means of a knife $p'$, Fig. 55, mounted on an L-shaped lever 427 pivoted at 428 on the table 420, and having an arm provided with an anti-friction roller 429 which engages with the cam 430 for controlling the movement of the knife. A spring 431 holds the knife lever 427 in engagement with its actuating cam. Means of other construction for severing the paper may be provided if desired.

The paper feeding device $p$ places the end of the strip of binding paper upon the upper face of a pressure roller $p^2$ mounted on an extension 435 of the table 420, and this table is movable toward and from the rotary mandrel $o'$, the roller being shown in its operative position in Figs. 54–56 inclusive, in which position the glued face of the binding paper is secured to the glued face of the cardboard. The extension 435 of the table is also provided with a lever 436 which is pivoted thereon, and on the outer end of which a crimping roller $p^3$ is journalled. The pressure roller $p^2$ is cylindrical in form and presses the binding paper into engagement with the cylindrical face of the cardboard on the mandrel $o'$, as shown in Fig. 59, and the crimping roller $p^3$ shown more clearly in Fig. 60, also has a cylindrical portion engaging the cylindrical side of the collar or body portion, and has a flange 437 which is adapted to engage a portion of the binding paper which extends beyond the edge of the cardboard of the collar, and to bend or fold this edge inwardly toward the axis of rotation of the collar or body portion so that this edge may be tucked in or folded into contact with the inner face of the collar for firmly securing the parts of the collar together, and for giving the upper edge of the collar or body portion a finished appearance.

The roller $p^2$ is first moved into engagement with the binding paper of the collar, this occurring while the cardboard is still being placed on the mandrel, and after this portion of the binding paper has been secured to the cylindrical side of the pasteboard portion of the collar, the crimping roller $p^3$ is moved into engagement with the binding paper of the collar, as shown in Fig. 56, this movement being accomplished by means of a link 440, one end of which is pivoted to the lever 436 and the other end of which is pivoted on the elbow portion of a bell crank lever 441. One arm of this lever is pivoted at 442 on the table 420 and the other arm of the lever is provided with an anti-friction roller 443 pressed by a spring against a cam 444 mounted on the cam shaft $e^{14}$. The rotation of this cam causes the bell crank lever 441 to swing about its pivot 442 to move the crimping roller supporting lever 436 into and out of its operative positions.

The mechanism for moving the table 420 so as to place the pressure roller $p^2$ into operative relation to the collar may be of any suitable or desired kind, that shown, particularly in Figs. 9 and 57, including an upright guide rod 450 secured on a fixed part of the frame of the machine and having a collar 451 secured thereto against which one end of a spring 452 bears, the other end of the spring bearing against the extension 435 of the table. The upper end of the guide rod 450 extends through a hole in the extension of the table. Consequently the spring 452 normally tends to move the table about its pivotal connection with the shaft $e^{14}$ so that the pressure roller $p^2$ will be moved into engagement with the collar or body portion which is formed on the mandrel $o'$. 453 represents a guide roller for the strip $b^3$ of cardboard, the guide roller being clamped on the guide rod 450.

The table 420 is swung about its pivotal connection with the shaft $e^{14}$ against the action of the spring 452 by any suitable mechanism, that shown in the construction illustrated including a cam-actuated lever 456 pivoted at the upper end of a post 457 also mounted on the fixed table $a^4$ of the machine. One end of this lever is provided with a set screw 458 extending through the lever and adapted to engage the extension 435 of the table, and the other end of the lever engages a cam 459 also mounted on the shaft $e^{14}$. The rotation of the cam causes the cam-actuated lever 456 to swing about its pivot and to swing the table downwardly so as to move the pressure roller $p^2$ out of engagement with the collar on the mandrel $o'$. Other means for moving the rollers into and out of operative relation to the collars or body portions of the box may be employed, if desired.

The rotary mandrel $o'$ is substantially similar in construction to the mandrels $k$ used in connection with the formation of the flanges for the box ends, and the collar forming mandrel $o'$ may be driven in any suitable or desired manner. In the construction shown, see particularly Figs. 58–61, the mandrel is provided with an enlarged hollow head 462, and an integral smaller stem or shank 463 which is journalled in a hub 464 mounted on the table $a^4$. The end of the shank portion 463 is secured on a gear 466 having a hollow hub portion 467. This hub portion communicates with a cap or end member 468 which is connected by means of a suction hose 469 to any suitable means for producing suction in the mandrel $o'$. 470 represents a gasket or gland for making a substantially air tight joint between the hub 467 and the cap 468 and 471 represents a set screw extending through the side member $a^6$ of the frame and engaging the suction cap 468 to hold the same against the hub 467 of the gear 466. No means are herein shown or described for producing suction in the mandrels $o'$ or $k$, since any desired means may be employed for this purpose. The mandrels are preferably connected with means for continuously withdrawing air therefrom, it having been found unnecessary to interrupt the suction in the mandrels while removing the flanges or collars therefrom. The gear 466 meshes with a gear 473 mounted on a shaft 474, and a sprocket wheel 475 also mounted on the shaft is driven by means of the sprocket chain 476 from a corresponding sprocket wheel on the sprocket shaft $f^2$.

The mandrel is also provided with means similar to those employed in connection with the mandrel $k$ for removing the collar therefrom, these means in the construction shown including a rotatable sleeve 480 mounted on the enlarged portion of the mandrel $o'$, and connected by means of keys or fingers 481 with a non-rotatable sleeve 482 which is mounted on the hub 464 of the upright bearing standard 465. The non-rotatable sleeve has pivotal connections 485 at opposite sides thereof with two parts or sections of a lever 486 which is pivoted at 487 on the bearing bracket 465. This lever is adapted to be swung about its pivot to cause the sleeve 480 to remove the collar or body portion of the box from the mandrel by means of a push rod 489 extending through a hole in the bearing bracket 465. The outer end of this rod is preferably screw threaded and a nut 490 is adjustable thereon. This nut in the construction shown, engages a washer 491 against which one end of a spring 492 bears, the other end of the spring engaging the bearing bracket 465 and tending to hold the lever 486 and the sleeves 482 and 480 in their normal or inoperative positions, as shown in Figs. 58–60. When the push rod 489 is moved against the action of the spring, the sleeves 480 and 482 are moved lengthwise of the mandrel to remove the collar or body portion of the box therefrom. This movement of the push rod 489 in the particular construction shown is effected through the medium of an extension 495 of a lever 496, this extension having a bifurcated end straddling the push rod 489 and adapted to engage the nut 490. This lever 496, as is clearly shown in Fig. 2, is pivoted at its upper end on the shaft 135. The lower end of this lever engages in a groove 498 formed in a barrel cam 499 mounted on the shaft $e^3$.

The collar or body portion after having the binding paper applied thereto is removed from the mandrel $o'$ to an arbor $r$ arranged on an arbor-supporting spider R mounted rigidly on a shaft $r'$. This shaft also has a gear $r^2$ arranged on one end thereof which is of the same size as the gears $n'$ $n^2$ of the other spider and supporting shafts, and which meshes with a gear $n'$ so that this spider-supporting shaft $r'$ will be rotated intermittently, causing the three arbors on the arbor supporting spider R to successively occupy three different positions, the spider rotating in the direction of the arrow shown in Fig. 9. When one of these arbors $r$ is in its first position, it is in axial alinement with the mandrel $o'$, and while in this position the collar which has been formed on the mandrel $o'$ is moved endwise from this mandrel onto the arbor $r$, as shown in Fig. 61. The moving of the collar from the mandrel $o'$ to the arbor $r$ also serves the purpose of tucking or folding the inwardly extending edge of the binding paper inwardly against the inner face of the cardboard of the collar so that the last step in the formation of the collar or body portion is effected by transferring the same from the mandrel $o'$ to the arbor $r$. The collar then appears as shown at $X^3$ in Fig. 62.

After the collar has been placed on the arbor $r$, the arbor spider R is moved through a third of a revolution to the left in Fig. 9, and thus places the freshly formed collar or body portion into axial alinement with the base portion $X^2$ held on the gripping device $n^3$ on the spider N. After the arbor $r$ has moved into this position, the collar or body portion $X^3$ is moved axially into the base $X^2$ of the box, which is held on the gripping membr $n^3$. It will be noted that the binding paper does not cover all of the outer surface of the cardboard of the collar or body portion, an annular strip $x^3$ being left uncovered. This portion of the collar being covered with glue, upon being inserted into the base $X^2$ of the box, forms a glued joint therewith, so that the collar or body portion and base are assembled in this operation of the machine and glued together.

The mechanism for removing the collar or body portion of the box from the arbor $r$ and assembling the same with the base of the box is preferably constructed as follows:

500 represents a slidable sleeve mounted on the arbor $r$ and this sleeve is connected by means of a plurality of rods 501 with a head 502 mounted on a guide stem 503 extending through a bore in the arbor $r$. A compression spring 504 is interposed between the head 502 and the portion of the arbor $r$ which is secured to the spider R, and normally holds the head 502 and the sliding sleeve 500 in the position shown in Fig. 61. The guide stem 503 is slidable relatively to the arbor $r$, and the head 502 moves with the guide stem, a collar 506 being secured to the guide stem and forming a stop for the head 502. When the guide stem is pushed inwardly, the head 502 will move inwardly therewith, and carry with it the rods 501 and thus move the slidable sleeve 500 into the position shown in Fig. 63, in which the freshly formed collar $X^3$ is pushed into the base of the box.

The moving of the guide stem 503 against the action of the spring 504 in the construction shown is accomplished by means of a lever 510 pivoted at 511 on a bracket 512 extending upwardly from the table $a^4$ of the machine. The upper end of this lever engages a set screw 514 secured in the end of the guide stem and adjustable relatively thereto, so that the movement of the slidable sleeve 500 can be varied independently of the movement of the lever 510. 515 represents a lock nut for holding the set screw in the desired position. The other end of the lever 510 is connected by means of a link 517 to one arm of a cam actuated lever 518 pivoted at 519 on the table $a^4$ of the machine. The lower end of this lever has an anti-friction roller engaging a cam 520 and a spring 521 bearing against the table $a^4$, and the lever 518 holds the lever in engagement with the cam. This cam is mounted on the shaft $e^6$. Any other suitable means for moving the slidable sleeve 500 lengthwise of the arbor $r$ for removing the collar or body portion of the box therefrom and inserting the same into the box base may be employed if desired.

The box is now completed, the cover being held on the gripping device $n^3$ mounted on the arm N', and it remains only to assemble the cover on the box itself and to discharge the box with a cover thereon from the machine.

The arm N' on which the box cover gripping device $n^3$ is mounted is provided with a boss or projection 523, Figs. 65 and 66, which is bored out to receive a hollow stem 524 which is secured to or formed integral with the head of the gripping device $n^3$, the boss 523 being provided with a slot through which the cam rod arm 336 extends. The hollow stem, in the construction shown, is held against turning and endwise movement by means of a pin 525 or analogous device. The arm N' is not rigidly secured on the shaft $n$ as is the spider N, but is arranged on a sleeve 530 which is mounted on and adapted to oscillate about the shaft $n$. This sleeve is provided with a plurality of grooves or keyways 531 and the arm N' has a hub 532 provided with corresponding keys or projections entering into the grooves or keyways 531 so that the arm N' may move lengthwise of the oscillatory sleeve 530 and may move about the axis of the shaft $n$ when the sleeve 530 is turned. The arm N', when the gripping device thereof receives the cover of the box from an arbor $h^3$, is in a position in axial alinement with a gripping device on the rotary spider N in the first position, and is moved from this position in a direction contrary to the direction of movement of the spider N into the position in alinement with the third position of the gripping devices on the spider N. The movement of the arm N' into and out of the cover-receiving position is effected by means of a link 535, see Figs. 12 and 69, which is pivotally connected with a rigid arm 536 of the oscillatory sleeve 530. The opposite end of this link engages with a cam 540 mounted on the shaft $e^{14}$, this cam being so designed as to hold the oscillatory sleeve first in a position in which the gripping device on the arm N' is in alinement with an arbor $h^3$ to take the finished box cover therefrom, and secondly into a position in which the box cover is in alinement with the body portion of the box held on an arm of the spider N. Other means for oscillating the sleeve 530 may be used, if desired.

The movement of the arm N' lengthwise of the oscillatory sleeve 530, in the particular construction shown in the drawings, see Figs. 12 and 69, is accomplished by means of a connecting arm or member 542 of substantially U-shaped construction having a bifurcated end portion 543 provided with pins 544 engaging in an annular groove 545 in the hub 532 of the arm N'. The other end of this arm has a sleeve or collar 546 slidably mounted on the shaft $r'$, the connecting arm being of the shape shown, so as to permit the movement of the arm throughout substantially the full length of the oscillatory sleeve without striking any of the other parts of the mechanism, particularly the lever 510 and parts actuated thereby. This U-shaped arm may be moved transversely of the machine by any desired means, such, for example, as a lever 550 having a slot 551 in one end thereof. A pin 552 secured on the sleeve or collar 546 extends through the slot 551 so as to form a sliding connection between the end of the lever and the sleeve. This lever is pivoted at 553 on a standard or post secured to the table $a^4$, and the other end thereof is also provided with a pin 556 engaging in a groove 557 in a barrel cam 558 secured on the shaft $e^{14}$. The groove in this cam is so formed that while the arm N' is in the position shown in Fig. 12, and in full lines in Fig. 69, in which position the gripping device $n^3$ is in alinement with the arbor $h^3$, the arm N' and gripping device thereon will be moved into the first dotted line position shown at $y'$ in Fig. 12, in which the gripping device $n^3$ with the cover held in place therein is in alinement with the corresponding gripping device $n^3$ on the spider N which holds the base of the box with the collar or body portion assembled therein.

The cam thereupon actuates the lever to swing the same into the second dotted line position shown at $y^2$ in Fig. 12, in which position the gripping device $n^3$ of the arm N' will place the cover of the box on the outer end of the collar or body portion of the box held in the corresponding gripping device on the spider N, as shown in Fig. 65.

When the arm N' is in a position in which the gripping device thereon receives the box cover from the arbor $h^3$, the cam rod arm 336 is actuated by means of a pin 364 to close the jaws of the gripping device, the operation of which has been described in connection with the gripping device arranged on the spider N. The cam rod arm actuating device employed in connection with the gripping device on the arm N' is shown in Fig. 68 and in the use of this mechanism, the lever 366 thereof, on which the pin 372 is omitted, as has already been stated, is pivotally connected with one end of an actuating link 559, the other end of which has a pivotal connection with a lever 560 pivoted on a bracket or bearing 561 on the table $a^4$. This lever is swung about its pivot to actuate the link 559 by means of a cam 562 mounted on the shaft $e^3$. When the arm N' is moved into the position indicated by $y'$ in Fig. 12, the cam rod arm 336 of the gripping device is moved into operative relation to the arm shifting pin 364 and immediately thereafter this pin and the mechanism connected therewith are shifted by the cam 562 from the dotted line position in Fig. 68 to the full line position, thus causing the pin 364 to shift the cam rod arm 336 and move the jaws of the gripping device into engagement with the box cover.

When the gripping device of the arm N' is in the position shown in Fig. 65, in which position the cover has been placed on the body portion of the box, the cam rod arm 336 is actuated by another mechanism which is shown in Figs. 9, 65 and 66, to release the jaws of the gripping mechanism from engagement with the box cover. This mechanism includes a curved lever 563 which is pivoted at 564 on an upright extension 565 of the table $a^4$. This lever is provided at its outer end with a pin or arm 566 adapted to engage the cam rod arm 336 and to move the same from the full line position shown in Fig. 66 to the dotted line position. This curved lever is provided at its lower end with a slot 568 in which a pin 569 of a link 570 engages. This link extends through a hole in the table $a^4$ and is connected at its lower end to one arm of a cam lever 572 pivoted on an extension 573 of the table $a^4$ and engaging a cam 575 mounted on the shaft $e^6$. The lever is held out of engagement with the cam arm 336 by means of a spring 576. When the cam swings this curved lever about its pivot the pin 566 thereof swings over the boss or projection 523 of the arm N' and swings the cam rod arm 336 into a position to cause the jaws of the gripping device n³ to release their hold upon the box cover. The arm actuating lever 563 is then immediately withdrawn, and the arm N' is also withdrawn through the action of the lever 550 and the mechanism described, into the position shown in full lines in Fig. 12, whereupon the oscillatory tube 530 is swung into a position to bring the gripping device n³ of the arm N' into operative relation to the next box cover delivered by the arbor supporting spider H. The completed box is then supported on the gripping device n³ of the spider N and is ready to be discharged from the machine, since immediately after the withdrawal of the arm N', the cam rod arm 336 of the gripping device on the spider N is actuated by means of the pin 372, as shown in Fig. 48. The box and cover are then completely assembled, as shown in Fig. 67, and are ready to be discharged from the machine.

Means may be used, if desired, for positively discharging the completed boxes from the machine. These box discharging means are shown in Figs. 70-72 inclusive, and include rods 577 which are slidably arranged near the ends of the arms of the spider N and which extend through the heads 325 of the gripping devices and the thimbles 337. These rods are normally held in positions shown in full lines in Figs. 70 and 71 by means of springs 578 each secured at one end to an ejecting rod 577, and at the other end to a thimble 337. Each of these rods may be moved into the position shown in dotted lines in Fig. 70, in which it pushes the box out of engagement with the gripping device n³ and permits the same to fall downwardly out of the machine.

Any suitable means may be employed for moving the ejecting rods against the action of the springs 578 to release a box from the gripping device when the gripping device is in the third position, as shown in Figs. 70 and 71, these means preferably acting to give the ejecting rods a blow or sharp movement so as to insure the discharge of the box from the gripping device. In the construction shown, these means include an arm 580 pivoted at 581 on a fixed part of the machine. The other end of this arm is provided with a head or striking portion 582 which is adapted to engage the ejecting rod 577. This arm is normally held in the position shown in full lines in Figs. 70 and 71 by means of a coil spring 583, one end of which is connected to the arm 580 and the other end of which is connected to a hammer 585 which is pivoted at 586 on a fixed part of the frame of the machine and which is provided with a head 587 adapted to strike the arm 580. This hammer normally occupies the position shown in full lines in Fig. 71, being held in this position by means of the spring 583.

In order to cause the hammer to strike a blow against the arm 580, the hammer is moved out into the dotted line position shown in Fig. 71 against the action of the spring 583, and is then released, causing the spring to move the hammer sharply in the reverse direction to strike the arm 580. The mechanism for moving the hammer against the action of the spring 583 includes a segmental plate 590 which is also movable about the pivot 586 of the hammer, and a dog or latch 591 is pivoted on the segmental plate 590. This dog is provided with a ratchet tooth 592 which is adapted to engage the hammer 585 when the same is in the position shown in full lines in Fig. 71, and upon the swinging of the segmental plate 590, the dog 591 swings with the plate, and the ratchet tooth thereof draws the hammer into the dotted line position in Fig. 71. When the dog reaches this position, an end or arm 593 thereof engages a set screw or stop 594 mounted on an extension or part 595 of the frame of the machine in such a manner as to cause the dog to swing from its full line position shown in Fig. 72 into the dotted line position, in which last-mentioned position the dog releases the hammer and permits the same to strike the arm 580 to actuate the ejecting rod 577. By adjusting the set screw 594, the time at which the box is ejected may be varied as desired. The swinging of the segmental plate 590 is effected by means of a link 596 pivotally connected thereto. The other end of this link, as is clearly shown in Fig. 2, is pivotally connected to the cam actuated lever 373, which also actuates the mechanism for moving the cam rod arms 336 of the gripping device for the box bases, so that the ejecting mechanism is actuated immediately after the jaws of the gripping device are opened. The segmental plate 590 is engaged by a spring 597 which opposes the movement of this plate to its normal position. Other means for ejecting the finished boxes may be employed, if desired.

The machine described has the advantages of completely making all of the parts of a box and also assembling the same, so that no hand work is required on the boxes. The construction of the machine is such that the several mechanisms cooperate with each other with great accuracy, so that the boxes made by this machine are more accurately made than those made partly by hand.

I claim as my invention:

1. In a box making machine, the combination of means for making body portions and end portions having substantially cylindrical flanges, and means for assembling said body portions and said end portions by means of a telescopic engagement of said flanges with said body portions.

2. In a box making machine, the combination of means for simultaneously making two box ends having substantially cylindrical flanges, means for making a cylindrical body portion, and means for placing said ends on said body portion so that said flanges and body portion telescope.

3. In a box making machine, the combination of means for simultaneously making two box ends, means for making a body portion, means for securing one of said ends to said body portion, and means for removably placing the other end on said body portion.

4. In a box making machine, the combination of means for making box ends, means for making a body portion by rolling paper having its outer surface glued, means for securing a box end on one end of said glued part of said body portion, means for covering the other end of said body portion, and means for frictionally securing a box end on said other end of said body portion.

5. In a box making machine, the combination of means for making box ends, means for making a body portion by rolling paper having its outer surface glued, means for placing a covering on said body portion, said covering leaving a part of said glued surface exposed, and means for placing a box end on said body portion in contact with said exposed part to secure said end on said body portion.

6. In a box making machine, the combination of means for making box ends, means for making a body portion by rolling paper having its outer surface glued, means for placing a covering on said body portion, said covering leaving a part of said glued surface exposed, means for placing a box end on said body portion in contact with said exposed part to secure said end on said body portion, and means for placing a box end on said covered part of said body portion to form a removable cover for the box.

7. In a box making machine, the combination of duplicate mechanisms facing in opposite directions for making box ends having substantially cylindrical flanges, means for making substantially cylindrical box body portions, means for moving said box ends into alinement with said body portions and telescopically assembling the flanges of said ends on said body portions.

8. In a box making machine, the combination of mechanism for making box ends having substantially cylindrical flanges, means for making substantially cylindrical box body portions, and gripping means adapted to carry said box ends into operative relation to said body portions to telescopically assemble said ends and said body portions.

9. In a box making machine, the combination of oppositely disposed mechanisms for making box ends having substantially cylindrical flanges, means for making substantially cylindrical box body portions, means for moving said box body portions between said box ends, and means for applying said box ends to said body portions so that said flanges and body portions telescope.

10. In a box making machine, the combination of oppositely disposed mechanisms for making box ends arranged at one end of the machine, means for making box body portions arranged at the other end of the machine, means for carrying said box ends and said body portions to an intermediate part of the machine, and means for assembling said body portions and said ends.

11. In a box making machine, the combination of means for making box ends, including a member for carrying said box ends to different positions, gripping members adapted to take said box ends from said carrying member, a mechanism for making box body portions, and means for actuating said gripping members to place said box ends on said body portions.

12. In a box making machine, the combination of oppositely disposed mechanisms for making box ends, including members for carrying said box ends to different positions, gripping members adapted to take said box ends from said carrying members and movable to different positions, a mechanism for making box body portions, means for placing a body portion into one of said box ends in one position of said gripping members, and means for placing a box end on the other end of said body portion while said gripping members are in another position.

13. In a box making machine, the combination of a pair of oppositely disposed mechanisms for simultaneously making a pair of box ends, each of said ends including a head having a flange extending outwardly therefrom, means for forming a box body portion by winding glued strips of cardboard and covering material upon each other with their glued faces in contact, and means for placing said box ends and said body portion into telescopic engagement.

14. In a box making machine, the combination of a pair of oppositely disposed mechanisms for simultaneously making a pair of box ends, means for forming a box body portion by winding glued strips of cardboard and covering material upon each other with their glued faces in contact, said covering material leaving a glued portion of the cardboard exposed at one end of said body portion, and means for placing one of said box ends on said glued portion to secure said end and said body portion together and for removably placing the other box end on said body portion.

15. In a box making machine, the combination of means for forming a box body portion by rolling a strip of cardboard and a strip of covering material together, said cardboard having its outer face glued and said covering material leaving a part of said glued face at one end of said body portion uncovered, and means for placing a box end on said uncovered end of the body portion to secure said end and body portion together.

16. In a box making machine the combination of a rotary member on which a part of a box may be formed, means for feeding a strip of material to said rotary member with one face thereof coated with adhesive substance, said strip being wound on said rotary member with the adhesive substance on the outside thereof, and means for feeding a strip of covering material to said rotary member, said strip of covering material being wound on said first mentioned material and said covering material having the inner face thereof coated with adhesive substance.

17. In a box making machine, the combination of a rotary member on which a part of a box may be formed and having means for holding a strip of material thereto, means for feeding a strip of material coated on one face with an adhesive to said rotary member so that said adhesive will be on the outside of said box part, and means for feeding a strip of covering material having one face coated to said rotary member so that the coated faces of said strips will contact.

18. In a box making machine, the combination of a rotary member on which a part of a box may be formed and having means for holding a strip of material thereto, means for feeding a strip of material coated on one face with an adhesive to said rotary member so that said adhesive will be on the outside of said box part, means for feeding a strip of covering material having one face coated to said rotary member so that the coated faces of said strips will contact, said covering strip being so applied as to leave one end of said body portion uncovered, and means for applying a box end to said end of the body portion to secure said box end and body portion together.

19. In a box making machine, the combination of a rotary member on which a part of a box may be formed and having means for holding a strip of material thereto, means for feeding a strip of material coated on one face with an adhesive to said rotary member so that said adhesive will be on the outside of said box part, means for feeding a strip of covering material having one face coated to said rotary member so that the coated faces of said strips will contact, and means for applying a head to the outer edge of said box part and securing said head in place by an edge of said covering material.

20. In a box making machine, the combination of a rotary member on which a part of a box may be formed and which has a suction opening in a part of the periphery thereof, and means for feeding a strip of material thereto so that the foremost end of the strip is placed on said suction opening during the continuous rotation of said rotary member.

21. In a box making machine, the combination of a rotary member on which a part of a box may be formed and which has a suction opening in a part of the periphery thereof, means for feeding a strip of material thereto, said strip being coated on one face with an adhesive, and a pressure device engaging a part only of said coated face to press superimposed layers of said material into contact with each other.

22. In a box making machine, the combination of a rotary member on which a part of a box may be formed, means on said rotary member for holding a strip of material thereon, means for feeding a strip of material to said rotary member for winding the strip on said member, the outer face of said strip being coated with adhesive, and a pressure member adapted to engage a part only of said coated face to press superimposed layers of said strip into contact with each other.

23. In a box making machine, the combination of a rotary member on which a part of a box may be formed, means on said rotary member for holding a strip of material thereon, means for feeding a strip of material to said rotary member for winding the strip on said member, the outer face of said strip being coated with adhesive, a pressure member adapted to engage a part only of said coated face to press superimposed layers of said strip into contact with each other, and means for moving said pressure member into and out of operative relation to said box part on said rotary member.

24. In a box making machine, the combination of a rotary member on which a part of a box may be formed, means on said rotary member for holding a strip of material thereon, means for feeding a strip of material to said rotary member for winding the strip on said member, the outer face of said strip being coated with adhesive, and a pressure roller having a relatively small peripheral portion adapted to engage the coated surface of said strip on said rotary member to press superimposed layers of said strip into contact with each other.

25. In a box making machine, the combination of a rotary member on which the flange of a box end is formed, a member which is movable into operative relation to said rotary member to receive said flange from said rotary member and which is adapted to move into another position to place said flange into correct relation to a box head, and means for moving said flange endwise from said first mentioned member to said other member.

26. In a box making machine, the combination of means for forming a box flange, intermittently movable means for receiving said box flange from said flange forming means, means for moving said flange endwise from said flange forming means to said movable means, and head-applying means to which said intermittently movable means carry said flange and which form a box end.

27. In a box making machine, the combination of means for forming a box flange, intermittently movable means for receiving said box flange from said flange forming means, means for moving said flange endwise from said flange forming means to said movable means, head-applying means to which said intermittently movable means carry said flange and which form a box end, and a gripping member adapted to take said box end from said intermittently movable member.

28. In a box making machine, the combination of means for forming a box flange, intermittently movable means for receiving said box flange from said flange forming means, head-applying means to which said intermittently movable means carry said flange and which form a box end, a box body forming mechanism, a gripping member adapted to take said box end from said intermittently movable member, and means for assembling said box body and box end.

29. In a box making machine, the combination of means for making a box end, including an arbor rotatable about its axis and intermittently movable to different positions, means for forming a box body portion, gripping means movable into a position to take a box end from said arbor and into a position to place said box end into axial alinement with said body portion, and means for producing relative movement of said box end and body portion axially toward each other to assemble said end and body portion.

30. In a box making machine, the combination of means for forming a flange including a rotary member arranged on a stationary part of the machine and adapted to receive a strip of material and to roll the same upon itself, a rotary arbor movable into axial alinement to said rotary member to receive said flange, said arbor being movable into a second position to place said flange into operative relation to a head, and means for applying covering material to said flange and head while said arbor is in said second position, to form a box end.

31. In a box making machine, the combination of means for forming a flange including a rotary member arranged on a stationary part of the machine and adapted to receive a strip of material and to roll the same upon itself, a rotary arbor movable into axial alinement to said rotary member to receive said flange, said arbor being movable into a second position to place said flange into operative relation to a head, and means for applying covering material to said flange and head while said arbor is in said second position, to form a box end, said arbor being movable into a third position in which the box end is removed therefrom.

32. In a box making machine, the combination of mechanism for securing together a flange and head to form a box end, an intermittently movable member on which the box end is supported, a box body forming mechanism including an intermittently movable member, and means for bringing the box ends and the body portions together to assemble the same.

33. In a box making machine, the combination of box end forming mechanism including an intermittently movable member on which the box end is supported, a box body forming mechanism including an intermittently movable member, and a movable gripping member adapted to take said box end from said first-mentioned intermittently movable member and to place the same into operative relation to a body portion on said second intermittently movable member.

34. In a box making machine, the combination of box end forming mechanism including an intermittently movable member on which the box end is supported, a box body forming mechanism including an intermittently movable member, a movable gripping member adapted to take said box end from said first-mentioned intermittently movable member and to place the same into operative relation to a body portion on said second intermittently movable member, means for assembling said body portion and said box end, and means for placing a box end on the other end of said body portion 35. In a box making machine, the combination of box end forming mechanism including a rotatable member, arbors rotatably mounted on said member, means with which said arbors cooperate to form box ends on said arbors, a second rotatable member having gripping devices adapted to hold box ends, said members being intermittently rotated so that said arbors and gripping devices are in alinement in one of their several positions, and means for actuating said gripping devices while in said position to take a box end from one of said arbors.

36. In a box making machine, the combination of box end forming mechanism including a rotatable member, arbors rotatably mounted on said member, means with which said arbors cooperate to form box ends on said arbors, a second rotatable member having gripping devices adapted to hold box ends, said members being intermittently rotated so that said arbors and gripping devices are in alinement in one of their several positions, means for actuating said gripping devices while in said position to take a box end from one of said arbors, and means for assembling said box end while supported on said second member with a box body portion.

37. In a box making machine, the combination of a pair of intermittently rotatable members, arbors rotatably mounted on said members, means with which said arbors cooperate to form box ends on said arbors, the box ends on said two members facing in opposite directions, an intermittently rotatable member having gripping devices mounted thereon and adapted to stop with a gripping device in alinement with an arbor on one of said first-mentioned members, means for causing said gripping devices to take a box end from an arbor, means in another position of said gripping device supporting member for inserting a box body portion into the box end held by said gripping device, and means for taking another box end from an arbor of the other first-mentioned member and placing said other end on said box body portion to form a completely assembled box.

38. In a box making machine, the combination of a pair of intermittently rotatable members, arbors rotatably mounted on said members, means with which said arbors cooperate to form box ends on said arbors, the box ends on said two members facing in opposite directions, an intermittently rotatable member having gripping devices mounted thereon and adapted to stop with a gripping device in alinement with an arbor on one of said first-mentioned members, means for causing said gripping devices to take a box end from an arbor, a third intermittently rotatable member having means on which a box body portion may be supported and which is adapted to carry the box body portion into alinement with the box end on said second rotary member, means for assembling said body portion and said box end, and means for removing another box end from the other of said first-mentioned members and for placing said other box end on said body portion.

39. In a box making machine, the combination of a pair of intermittently rotatable members, arbors rotatably mounted on said members, means with which said arbors cooperate to form box ends on said arbors, the box ends on said two members facing in opposite directions, an intermittently rotatable member having gripping devices mounted thereon and adapted to stop with a gripping device in alinement with an arbor on one of said first-mentioned members, means for causing said gripping devices to take a box end from an arbor, means in another position of said gripping device supporting member for inserting a box body portion into the box end held by a gripping device, a second gripping device adapted to cooperate with the other of said first-mentioned members for taking a box end therefrom, an arm on which said second gripping device is mounted, and means for swinging said arm from a position in alinement with an arbor into a position in alinement with said box body portion after the same has been assembled with a box end and for placing the end held in the gripping device of said arm on said box body portion.

40. In a box making machine, the combination of a pair of intermittently rotatable arbor supporting members having each a plurality of arbors arranged thereon, means cooperating with said arbors for forming box ends thereon, said box ends being arranged so that the box ends on one of said arbor supporting members has its open side arranged facing the open side of a box end on said other arbor supporting member, an intermittently rotatable gripping device supporting member provided with a plurality of gripping devices which are successively brought into alinement with arbors on said arbor supporting members to remove the box ends therefrom, an intermittently rotatable arbor supporting member having a plurality of arbors on which box body portions are formed and which is movable to place said arbors successively into alinement with gripping devices having box ends held therein, means for removing said box body portions from said arbors and placing one of the ends of the body portion into one of said box ends, a gripping device held on a movable arm and adapted to cooperate with the other of said first mentioned arbor supporting members to remove box ends therefrom, and means for moving said last-mentioned gripping device with a box end held therein into a position to assemble the box end on the other end of said body portion.

41. In a box making machine, the combination of a pair of intermittently rotatable arbor supporting members each having a plurality of arbors arranged thereon, means cooperating with said arbors for forming box ends thereon, said box ends being arranged so that the box ends on one of said arbor supporting members has its open side arranged facing the open side of a box end on said other arbor supporting member, an intermittently rotatable gripping device supporting member provided with a plurality of gripping devices which are successively brought into alinement with arbors on said arbor supporting members to remove the box ends therefrom, an intermittently rotatable arbor supporting member having a plurality of arbors on which box body portions are formed and which is movable to place said arbors successively into alinement with gripping devices having box ends held therein, means for removing said box body portions from said arbors and placing one of the ends of the body portions into one of said box ends, a gripping device held on a movable arm and adapted to cooperate with the other of said first-mentioned arbor supporting members to remove box ends therefrom, means for moving said last-mentioned gripping device with a box end held therein into a position to assemble the box end on the other end of said body portion, and means for actuating said gripping devices to cause the same to engage and disengage said box ends.

42. In a box making machine, the combination of a rotary member, means on said member for engaging a strip of material while said member is rotating and for rolling said strip on said member to form a part of a box, a stationary table adjacent to said rotary member and over which said strip of material passes, and a movable slide on said stationary table provided with means for gripping the strip of material to move the same toward said rotary member.

43. In a box making machine, the combination of a rotary member, said member being hollow and having suction openings on a part of the peripheral face thereof, a stationary table over which a strip of material passes, a movable material gripping member on said stationary table for advancing the material to said rotary member, and means for timing the operation of said material advancing member and said rotary member so that the leading end of the strip of material is fed upon the suction openings in said rotary member to enable said rotary member to engage said strip while said member is rotating.

44. In a box making machine, the combination of a member rotatable about a fixed axis, means for rolling a strip of material around said rotatable member to form a flange, an arbor in operative relation to said rotatable member and to which the flange is transferred from said rotatable member, and means for applying a strip of covering material over said flange while on said arbor.

45. In a box making machine, the combination of a member rotatable about a fixed axis, means for rolling a strip of material around said rotatable member to form a flange, a rotatable arbor in operative relation to said rotatable member and which is adapted to receive the flange from said rotatable member, means for applying a strip of covering material over said flange on said arbor in such a manner that the edge of the covering material extends beyond said flange, means for turning said edge of the covering material toward the axis of rotation of said arbor, and means on said arbor for turning the edge of the covering material against the inner face of said flange.

46. In a box making machine, the combination of a member rotatable about a fixed axis, means for rolling a strip of material around said rotatable member to form a flange, a rotatable arbor in operative relation to said rotatable member and which is adapted to receive the flange from said rotatable member, means for placing a head into operative relation to said arbor, and means for applying a strip of covering material to said flange and said head.

47. In a box making machine, the combination of a member rotatable about a fixed axis, means for rolling a strip of material around said rotatable member to form a flange, an arbor movable into and out of alinement with said rotary member and which is adapted to receive the flange from said rotatable member, means for applying a strip of covering material to said flange on said arbor while said arbor is out of alinement with said rotatable member in such a manner that an edge of the covering material extends beyond said flange, means for turning said edge of the covering material toward the axis of rotation of said rotatable member, and means for turning said edge of the covering material against the inner face of said flange.

48. In a box making machine, the combination of a member rotatable about a fixed axis, means for rolling a strip of material around said rotatable member to form a flange, an arbor movable into a position in alinement with said rotatable member to receive the flange therefrom and movable into another position, means for placing a head in operative relation to the flange on said arbor while the arbor is in said other position, and means for applying a strip of covering material to said flange and head to form a box end while said arbor is in said other position.

49. In a box making machine, the combination of a member rotatable about a fixed axis, means for rolling a strip of material around said rotatable member to form a flange, an arbor movable into a position in alinement with said rotatable member to receive the flange therefrom and movable into another position, means for placing a head in operative relation to the flange on said arbor while the arbor is in said other position, means for applying a strip of covering material to said flange and head to form a box end while said arbor is in said other position, said arbor being movable into a third position, and means for removing said box end from said arbor while said arbor is in said third position.

50. In a box making machine, the combination of a member rotatable about a fixed axis, means for rolling a strip of material around said rotatable member to form a flange, an arbor movable into a position in alinement with said rotatable member to receive the flange therefrom and movable into another position, means for placing a head in operative relation to the flange on said arbor while the arbor is in said other position, means for applying a strip of covering material to said flange and head to form a box end while said arbor is in said other position, said arbor being movable into a third position, and a gripping device adapted to remove the box end from said arbor while said arbor is in said third position, and to move said box end into another position.

51. In a box making machine, the combination of a member rotatable about a fixed axis, means for rolling a strip of material around said rotatable member to form a flange, an arbor movable into a position in alinement with said rotatable member to receive the flange therefrom and movable into another position, means for placing a head in operative relation to the flange on said arbor while the arbor is in said other position, means for applying a strip of covering material to said flange and head to form a box end while said arbor is in said other position, said arbor being movable into a third position, a gripping device adapted to remove the box end from said arbor while said arbor is in said third position, and to move said box end into another position, and means for assembling a box end with a box body portion while said box end is held in said gripping device in said other position thereof.

52. In a box making machine, the combination of a member rotatable about a fixed axis, means cooperating with said member for forming a flange thereon, an arbor movable into alinement with said rotatable member, means for transferring said flange from said member to said arbor, a device adapted to receive a box head, means for moving said arbor with said flange thereon into operative relation to the head held in said device, and means for applying covering material to said flange and head to secure said flange and head together to form a box end.

53. In a box making machine, the combination of a member rotatable about a fixed axis, means cooperating with said member for forming a flange thereon, an arbor movable into alinement with said rotatable member, means for transferring said flange from said member to said arbor, a device adapted to receive a box head, means for moving said arbor with said flange thereon into alinement with said device, means for moving said head from said device into operative relation to said flange, and means for applying covering material to said flange and head to form a box end.

54. In a box making machine, the combination of a rotatable arbor adapted to support a flange for a box end, a magazine containing box heads and in which said heads are arranged in substantially horizontal planes, and inclined guide means adapted to receive a box head from said magazine and to place said head into operative relation to said arbor, said guide means including a device for turning a box head from a substantially horizontal to a substantially vertical position.

55. In a box making machine, the combination of a rotatable arbor adapted to support a flange for a box end, a magazine containing box heads and in which said heads are arranged in substantially horizontal planes, a guide chute adapted to carry the box heads into operative relation to said arbor, and an extension on said chute on which the box heads drop from said magazine and which turns the same from a substantially horizontal position into a substantially upright position and guides said heads into said chute.

56. In a box making machine, the combination of a rotary mandrel having suction openings in a side thereof, means for feeding a strip of paper to said mandrel whereby said suction openings draw said strip to said mandrel and cause said strip to be wound on said mandrel to form a flange, a collar mounted on said mandrel to move lengthwise thereof to remove said flange therefrom and adapted to cover said suction openings when said flange is removed from said mandrel, and means for actuating said collar.

57. In a box making machine, the combination of a rotary mandrel having suction openings in a side thereof, means for feeding a strip of paper to said mandrel whereby said suction openings draw said strip to said mandrel and cause said strip to be wound on said mandrel to form a flange, a collar mounted on said mandrel to move lengthwise thereof to remove said flange therefrom and adapted to cover said suction openings when said flange is removed from said mandrel, means for actuating said collar, and an arbor movable into operative relation to said mandrel to receive the flange therefrom.

58. In a box making machine, the combination of a rotary mandrel having suction openings in a side thereof, means for feeding a strip of paper to said mandrel whereby said suction openings draw said strip to said mandrel and cause said strip to be wound on said mandrel to form a flange, a collar mounted on said mandrel to move lengthwise thereof to remove said flange therefrom and adapted to cover said suction openings when said flange is removed from said mandrel, means for actuating said collar, an arbor movable into operative relation to said mandrel to receive the flange therefrom, and means for applying a head to said flange while said flange is on said arbor.

59. In a box making machine, the combination of a head-receiving holder having a slot in one side thereof through which a box head may be inserted, a rotary arbor adapted to support a box flange and movable into operative relation to said head-receiving holder, means for producing relative movement between said arbor and said holder to place said head against the flange on said arbor, means for applying covering material to said head and flange to form a box end, and means for moving said arbor out of operative relation to said holder when said box end is formed.

60. In a box making machine, the combination of an intermittently moving arbor supporting member having a plurality of arbors rotatably mounted thereon, each of said arbors being adapted to support a box flange, a head-receiving holder, means for intermittently feeding box heads to said holder, means for intermittently moving said arbor supporting member to place the arbors successively into alinement with said holder, means for producing relative movement between said arbors and said holder to place the box head in said holder into operative relation to a box flange on an arbor, and means for applying covering material to the head and flange to form a box end.

61. In a box making machine, the combination of an arbor adapted to support a flange thereon, means for holding a box head on the end of said arbor, means for feeding covering material to said flange and head for securing the same together, a preliminary presser roller for pressing said covering material against said flange and head, a crimping roller for bending an edge of the covering material toward the axis of rotation of said arbor, and a finishing roller for securing covering material to said head and flange.

62. In a box making machine, the combination of an arbor adapted to support a flange thereon, means for holding a box head on the end of said arbor, means for feeding covering material to said flange and head for securing the same together, preliminary and final presser rollers for securing covering material to said head and flange to secure said head and flange together, a crimping roller for bending the edge of said covering material toward the axis of rotation of said arbor, and a spring for yieldingly pressing said crimping roller toward the edge of the flange.

63. In a box making machine, the combination of an arbor adapted to support a flange thereon, means for holding a box head on the end of said arbor, means for feeding covering material to said flange and head for securing the same together, a preliminary presser roller for pressing said covering material against said flange and head, a movable support on which said preliminary roller is mounted and which is movable to place said roller into and out of operative relation to the flange and head on said arbor, a frame movably mounted on said support, and rollers mounted on said frame and adapted to be moved into engagement with said flange and head for securing the covering material thereto.

64. In a box making machine, the combination of an arbor adapted to support a flange thereon, means for holding a box head on the end of said arbor, means for feeding covering material to said flange and head for securing the same together, a preliminary presser roller for pressing said covering material against said flange and head, a movable support on which said preliminary roller is mounted and which is movable to place said roller into and out of operative relation to the flange and head on said arbor, a frame movably mounted on said support, a crimping roller mounted on said movable frame, and a spring for yieldingly pressing said crimping roller toward the edge of said flange for turning the covering material toward the axis of rotation of said arbor.

65. In a box making machine, the combination of an arbor adapted to support a flange thereon, means for holding a box head on the end of said arbor, means for feeding covering material to said flange and head for securing the same together, a preliminary presser roller for pressing said covering material against said flange and head, a movable support on which said preliminary roller is mounted and which is movable to place said roller into and out of operative relation to the flange and head on said arbor, a frame movably mounted on said support, a final pressing roller on said frame, an arm pivotally mounted on said frame, a crimping roller on said arm, a spring yieldingly engaging said arm, and means for moving said frame relatively to said support for placing the rollers mounted on said frame into operative relation to said flange and head, said spring yieldingly pressing said crimping roller toward the edge of the box flange.

66. In a box making machine, the combination of an arbor adapted to support a flange thereon, means for holding a box head on the end of said arbor, a presser roller for pressing covering material to said flange and head, a movable support on which said roller is mounted and which is movable to place said roller into and out of operative relation to the flange and head on said arbor, and mechanism mounted on said support for feeding covering material into operative relation to said flange and head.

67. In a box making machine, the combination of an arbor adapted to support a flange thereon, means for holding a box head on the end of said arbor, means for feeding covering material to said flange and head for securing the same together, a preliminary presser roller for pressing said covering material against said flange and head, a movable support on which said preliminary roller is mounted and which is movable to place said roller into and out of operative relation to the flange and head on said arbor, and means on said support for cutting covering material after the desired length of the same has passed to said flange and head.

68. In a box making machine, the combination of pairs of oppositely disposed arbors adapted to support box flanges, means for placing box heads into operative relation to said flanges, a set of rollers adapted to cooperate with the flange and head on each arbor, a common support for said two sets of rollers, means for feeding covering material to said flanges and heads on said arbors, and a single actuating means for moving said support to cause said rollers to move into operative relation to the flanges and heads on said arbors.

69. In a box making machine, the combination of pairs of oppositely disposed arbors adapted to support box flanges, means for placing box heads into operative relation to said flanges, a set of rollers adapted to cooperate with the flange and head on each arbor, a common support for said two sets of rollers, advancing mechanisms on said support for feeding covering material into operative relation to the flanges and heads on said arbors, a single actuating mechanism on said supporting device for actuating said advancing mechanisms, and a single actuating means for moving said support to cause said rollers to move into operative relation to the flanges and heads on said arbors.

70. In a box making machine, the combination of a rotatable arbor adapted to receive a flange for a box end and including a relatively rigid outer part and a movable sleeve which together support said flange, means for feeding a box head into operative relation to said flange, means for applying covering material to said flange and head to secure the same together, a crimping roller adapted to engage the covering material to press the same radially with reference to said arbor when said movable sleeve is out of engagement with said flange, and means for returning said movable sleeve into operative relation to said flange to fold the edge of said covering material against the inner face of said flange.

71. In a box making machine, the combination of an intermittently rotatable member having a plurality of arbors mounted thereon which are adapted to support box flanges, each of said arbors including a relatively fixed outer part and a slidable sleeve movable relatively to said outer part for performing an operation on the boxes, a lever pivoted on said arbor supporting member and pivotally connected with said movable sleeve and having an arm projecting outwardly with reference to said arbor supporting member, a slotted member mounted on said machine and adapted to receive the end of said arm in the slot thereof during the intermittent movement of said arbor supporting member, and means for moving said slotted member while said arm extends into said slot to actuate said lever to move said sleeve.

72. In a box making machine, the combination of an intermittently rotatable arbor supporting member having a plurality of arbors mounted thereon, a sleeve slidably mounted on each of said arbors, levers mounted on said arbor supporting member and engaging said sleeves to move the same, a slotted member on said machine which is so arranged that the ends of said levers enter into the slot of said slotted member during the intermittent movement of said arbor supporting member, and means for moving said slotted member in a direction substantially transverse of the slot therein to cause said levers to swing to produce movement of said sleeves.

73. In a box making machine, the combination of an intermittently rotatable member having a plurality of arbors mounted thereon which are adapted to support box flanges, each of said arbors including a relatively fixed outer part and a slidable sleeve movable relatively to said outer part for performing an operation on the boxes, a lever pivoted on said arbor supporting member and pivotally connected with said movable sleeve and having an arm projecting outwardly with reference to said arbor supporting member, and means on said machine to cause said lever to swing on its axis to actuate said sleeves.

74. In a box making machine, the combination of a pair of intermittently movable arbor supporting members having the arbors thereof facing in opposite directions, means cooperating with said arbors to form box ends thereon, said means including a sleeve movably mounted on each of said arbors, a lever for each of said sleeves, said levers being pivoted on said arbor supporting members and having arms extending beyond said members, slotted members mounted on said machine and arranged to receive the ends of said arms during the intermittent movement of said members, and means for moving said slotted members in a direction transverse with reference to the slots therein to cause said levers to swing on their axes to move said sleeves.

75. In a box making machine, the combination of a pair of intermittently movable arbor supporting members having the arbors thereof facing in opposite directions, means cooperating with said arbors to form box ends thereon, said means including a sleeve movably mounted on each of said arbors, a lever for each of said sleeves, said levers being pivoted on said arbor supporting members and having arms extending beyond said members, and means with which said arms are adapted to move into operative relation during the intermittent rotation of said arbor supporting members and which cause the actuation of said levers to move said sleeves.

76. In a box making machine, the combination of an arbor adapted to support a box end, a gripping device adapted to engage said box end to remove the same from said arbor, said gripping device including radially movable jaws, means for producing relative movement between said gripping device and said arbor to bring said jaws into operative relation to the box end on said arbor, and means for closing and opening said jaws to enable said device to remove the box end from said arbor and to release the box end.

77. In a box making machine, the combination of an arbor adapted to support a box end, a gripping device adapted to engage said box end to remove the same from said arbor, said gripping device including radially movable jaws, means for moving said gripping device into operative relation to said arbor to take the box end therefrom, and into another position to discharge the box end, and means on said machine for closing said jaws while said gripping device is in operative relation to said arbor and for opening said jaws when said gripping device is in said other position.

78. A gripping device for a box making machine including a plurality of jaws adapted to engage a part of a box, a head on which said jaws are movable radially to grip and release said box part, and a rod extending into said head and having a cam portion which is adapted to be turned upon its axis to cause said jaws to move into and out of their gripping positions.

79. A gripping device for a box making machine including a plurality of jaws adapted to engage a part of a box, a head on which said jaws are movable radially to grip and release said box part, a rod extending into said head and having a cam portion which is adapted to be turned upon its axis to cause said jaws to move into and out of their gripping positions, an arm extending radially from said cam rod, and means on said machine for engaging said arm to actuate said cam rod.

80. A gripping device for a box making machine including a plurality of jaws adapted to engage a part of a box, a head on which said jaws are movable radially to grip and release said box part, a rod extending into said head and having a cam portion which is adapted to be turned upon its axis to cause said jaws to move into and out of their gripping positions, means for moving said gripping device into different positions, and means on different parts of said machine to actuate said cam rod while said gripping device is in different positions on the machine.

81. In a box making machine, the combination of an intermittently rotatable support, a plurality of gripping devices mounted on said support, an arbor on said machine adapted to support a box end, said gripping devices being movable successively into operative relation to said arbor during the intermittent movement of said supporting member, each of said gripping devices including a plurality of jaws movable radially, and a cam rod for causing the actuation of said jaws, means in proximity to said arbor for actuating said cam rod to cause said jaws to grip a box end on said arbor, and means adapted to engage the cam rods of said gripping devices to open said jaws when said gripping devices are in another position.

82. In a box making machine, the combination of an intermittently movable support, a gripping device mounted on said support, an arbor on said machine adapted to support a box end, said support placing said gripping device into a position in alinement with said arbor and into another position, and means for moving said gripping device while in alinement with said arbor axially to enable said gripping device to engage a box end on said arbor and away from said arbor to remove the box end therefrom.

83. In a box making machine, the combination of an intermittently movable support, a gripping device mounted on said support, an arbor on said machine adapted to support a box end, said support placing said gripping device into a position in alinement with said arbor and into another position, parts on said gripping device and the body portion of the machine which interlock when said gripping device moves into alinement with said arbor, and means for actuating said part on the body portion of the machine for moving said gripping device toward and from said arbor.

84. In a box making machine, the combination of an intermittently movable support, a gripping device mounted on said support, an arbor on said machine adapted to support a box end, said support placing said gripping device into a position in alinement with said arbor and into another position, parts on said gripping device and the body portion of the machine which interlock when said gripping device moves into alinement with said arbor, means for actuating said part on the body portion of the machine for moving said gripping device toward and from said arbor, and means for closing said gripping device when the same is in operative relation to a box end on said arbor.

85. In a box making machine, the combination of an intermittently movable support, a gripping device mounted on said support, an arbor on said machine adapted to support a box end, said support placing said gripping device into a position in alinement with said arbor and into another position, a member having an undercut slot, arranged on the frame of the machine, a part on said gripping device adapted to enter said slot as said gripping device moves into alinement with said arbor, and means for moving said slotted member to cause said gripping device to move toward and from said arbor.

86. In a box making machine, the combination of an intermittently movable support, a gripping device mounted on said support, an arbor on said machine adapted to support a box end, said support placing said gripping device into a position in alinement with said arbor and into another position, a member on the frame of the machine which is adapted to move said gripping device axially into operative relation to the box end on said arbor, and connecting parts on said gripping device and said member which are adapted to be placed into operative relation to each other when said gripping device is moved by said support into axial alinement with said arbor.

87. In a box making machine, the combination of an intermittently movable support, a gripping device mounted on said support, an arbor on said machine adapted to support a box end, said gripping device being movable by said support into and out of alinement with said arbor, a jaw-carrying head on said gripping device movable axially into and out of operative relation to said arbor to remove a box end therefrom, a spring for normally holding said head out of operative relation to said arbor, means on said machine for pushing said head toward said arbor against the action of said spring, and a second spring connected with said means for cooperating with said first spring for drawing said head away from said arbor to remove a box end therefrom.

88. In a box making machine, the combination of an arbor adapted to carry a box end, a gripping device movable into operative relation to said arbor, jaws on said gripping device movable radially into gripping engagement with said box end, a head on which said jaws are mounted, a spring extending around said head and engaging said jaws to press the same into gripping relation to a box end, and means within said head to move said jaws against the action of said spring.

89. In a box making machine, the combination of an arbor adapted to carry a box end, a gripping device movable into operative relation to said arbor, jaws on said gripping device movable radially into gripping engagement with said box end, a head on which said jaws are mounted, a spring extending around said head and engaging said jaws to press the same into gripping relation to a box end, and a cam rod extending into said head and adapted to be actuated to move said jaws outwardly against the action of said spring.

90. In a box making machine, the combination of an intermittently movable support for a gripping member having movable jaws to engage and release a box end, link mechanism for actuating said gripping jaws while in one position to cause said jaws to engage a box end, and means for opening said jaws while said intermittently movable support holds said gripping member in another position.

91. In a box making machine, the combination of an intermittently movable support for a gripping member having movable jaws to engage and release a box end, a cam rod axially arranged on said gripping device for actuating the jaws thereof, a link mechanism having a part extending into operative relation to said gripping device while the same is in one of its positions to actuate said cam rod for closing the jaws, and means for actuating said cam rod while said jaws are in another position to open the same.

92. In a box making machine, the combination of an intermittently movable support for gripping devices having movable jaws to engage and release a box end, said support being movable to successively place said gripping members into different positions, a cam rod on each gripping device for causing the opening and closing of the jaws thereof, and a link mechanism having a part extending into operative relation to one of said gripping devices to close the jaws thereof and having a part for simultaneously actuating the cam rod of another gripping device to open the jaws thereof.

93. In a box making machine, the combination of a rotary member, means for winding thereon a strip of material having its outer face coated with glue, and means for applying a covering strip to said material while the same is being wound on said rotary member, the inner face of said covering strip being also coated with glue.

94. In a box making machine, the combination of a rotary member, means for winding thereon a strip of material having its outer face coated with glue, means for applying a covering strip to said material while the same is being wound on said rotary member, the inner face of said covering strip being also coated with glue, said covering strip being applied to said material so as to leave one end of the glued material exposed and so as to project beyond the other end of said material, and means for folding said projecting portion of said covering strip inwardly against the inner face of said material.

95. In a box making machine, the combination of a rotary member, means for winding thereon a strip of material having its outer face coated with glue, means for applying a covering strip to said material while the same is being wound on said rotary member, the inner face of said covering strip being also coated with glue, said covering strip being applied to said material so as to leave one end of the glued material exposed and so as to project beyond the other end of said material, means for turning said projecting portion of the covering strip toward the axis of rotation of said rotary member, an arbor in alinement with said rotary member, and means for transferring said material from said rotary member to said arbor to turn said projecting portion of the covering strip inwardly against the inner face of said material.

96. In a box making machine, the combination of a rotary member, means for winding thereon a strip of material having its outer face coated with glue, means for applying a covering strip to said material while the same is being wound on said rotary member, the inner face of said covering strip being also coated with glue, said covering strip being applied to said material so as to leave one end of the glued material exposed and so as to project beyond the other end of said material, means for turning said projecting portion of the covering strip toward the axis of rotation of said rotary member, an arbor in alinement with said rotary member, means for transferring said material from said rotary member to said arbor to turn said projecting portion of the covering strip inwardly against the inner face of said material, and means for moving said arbor into another position to place said material into a position and so that said exposed portion thereof enters into a box end to form a glued connection therewith.

97. In a box making machine, the combination of a gripping device for holding a box base with a box body portion assembled thereon, a member for holding a box cover, and a gripping device adapted to take said cover from said member and move the same from said member to said box body portion to form a complete box.

98. In a box making machine, the combination of a gripping device for holding a box base with a box body portion assembled thereon, a member for holding a box cover, said member being out of alinement with said gripping device, a second gripping device adapted to remove said box cover from said member, means for moving said second gripping device into alinement with said box body portion, and means for moving said second gripping device toward said box body portion while in alinement therewith to place said cover thereon.

99. In a box making machine, the combination of a gripping device for holding a box base with a box body portion assembled thereon, a member for holding a box cover, said member being out of alinement with said gripping device, a second gripping device, an arm on which said second gripping device is mounted, a sleeve movable in a fixed arc and on which said arm is slidable lengthwise, means for causing said second gripping device to take a box cover from said cover supporting member, means for swinging said sleeve to bring said second gripping device into alinement with said box body portion, and means for moving said arm lengthwise of said sleeve for placing said gripping device upon said box body portion.

100. In a box making machine, the combination of a pair of mechanisms for forming a box base and a box cover, said mechanisms including intermittently movable members having arbors mounted thereon for supporting said box bases and box covers, an intermittently rotatable member having gripping devices thereon adapted to take said box bases from one of said arbor supporting members and to carry the same to successive different positions, a box body portion forming mechanism including an intermittently rotatable arbor supporting member on which the box body portions are supported and the arbors of which are movable into alinement with the gripping device in one of the positions thereof, means for moving said body portions lengthwise into said box bases, an oscillatory arm, a gripping device mounted on said arm and adapted to take a box cover from one of said arbor supporting members, and means for moving said arm lengthwise of a box body portion for placing a box cover thereon.

101. In a box making machine, the combination of means for forming a box base, a gripping member for taking said box base from said forming means, means for forming a box body portion, means for placing said box body portion into said box base while held in said gripping member, means for forming a box cover, and means for placing said cover on said box body portion.

102. In a box making machine, the combination of means for forming a box base, a gripping member for taking said box base from said forming means, means for forming a box body portion, means for placing said box body portion into said box base while held in said gripping member, means for forming a box cover, means for placing said cover on said box body portion to form a complete box, and an ejecting mechanism for removing said complete box from said gripping device.

103. In a box making machine, the combination of means for forming a box end, a gripping device for holding said box end, means for assembling other parts of a box in said box end while held in said gripping device, said gripping device having jaws, means for opening said jaws after said parts have been assembled in said box end, and an ejecting device for removing said box end out of operative relation to said gripping device.

104. In a box making machine, the combination of means for forming a box end, a gripping device for holding said box end, means for assembling other parts of a box in said box end while held in said gripping device, said gripping device having jaws, means for opening said jaws after said parts have been assembled in said box end, and an ejecting device for removing said box end out of operative relation to said gripping device, said ejecting device including a rod extending lengthwise of said gripping device into proximity to said box end and yieldingly held out of engagement therewith, and a hammer for moving said rod toward said box end.

105. In a box making machine, the combination of means for forming a box end, a gripping device for holding said box end, means for assembling other parts of a box in said box end while held in said gripping device, said gripping device having jaws, means for opening said jaws after said parts have been assembled in said box end, and an ejecting device for removing said box end out of operative relation to said gripping device, said ejecting device including a rod extending lengthwise of said gripping device into proximity to said box end and yieldingly held out of engagement therewith, a hammer for moving said rod toward said box end, and mechanism for causing the actuation of said hammer when said jaws are opened.

106. In a mechanism for forming cylindrical portions of boxes from a strip of material, the combination of a reel on which the strip is wound, a rotary suction member on which portions of said strip are wound to form cylindrical box portions, and means for moving said reel relatively to said suction member during a portion of the winding operation thereof to permit the strip to advance without unwinding the same from said reel.

107. In a box making machine, the combination of a member rotatable about a relatively fixed axis and on which portions of a strip of material may be wound to form cylindrical box portions, a reel on which said strip is wound, and means for moving said reel in one direction relatively to said rotatable member so that the strip may advance toward said member without unwinding from said reel during a portion of the operation of winding said strip on said rotatable member, said reel being moved in the opposite direction to unwind a portion of the strip therefrom after the preliminary winding of said strip on said member.

108. In a box making machine, the combination of a stationary frame, a rotary member on said frame adapted to wind strips of material upon itself to form cylindrical box portions, a reel for the material from which said box portions are made, a movable frame member upon which said reel is mounted, and means for moving said movable frame member to feed said material to said rotary member without unwinding the material from said reel when material is first taken up by said rotary member.

109. In a box making machine, the combination of a member rotatable about a relatively fixed axis and on which portions of a strip of material may be wound to form cylindrical box portions, a reel on which said strip is wound, means for moving said reel in a direction to advance the strip toward said rotary member without unwinding the same from said reel during a portion of the operation of winding said strip on said rotatable member, and in the opposite direction to unwind a portion of the strip therefrom, and means on said machine for preventing the strip from moving in a rearward direction while said reel is moved in a direction to unwind a portion of the strip therefrom.

110. In a box making machine, the combination of a reel on which a strip of material is wound, a rotary member on which portions of said strip are wound to form cylindrical box portions, and means for moving said reel in a direction to advance the material toward said rotary member while the first layer of material is wound on said rotary member, and for moving said reel in an opposite direction to unwind the material therefrom after said first layer has been wound around said rotary member.

111. In a box making machine the combination of a fixed frame, a plurality of rotary members on said frame on which strips of material are wound to form cylindrical box portions, a frame member movable relatively to said fixed frame, a plurality of reels on said movable member for the material from which said box portions are made, means for feeding said strips of material to said rotary members for winding the same thereon, means for moving said movable frame member in a direction to permit the material to be advanced to said rotary members without unwinding the same from said reels, and means for preventing said strips of material from moving in the reverse direction when said movable frame member is moved in the opposite direction to unwind material from said reels.

ARTHUR T. MOORE.